United States Patent
Barton

(10) Patent No.: US 8,261,315 B2
(45) Date of Patent: Sep. 4, 2012

(54) MULTICASTING MULTIMEDIA CONTENT DISTRIBUTION SYSTEM

(75) Inventor: James M. Barton, Alviso, CA (US)

(73) Assignee: TiVo Inc., Alviso, CA (US)

(*) Notice: Subject to any disclaimer, the term of this patent is extended or adjusted under 35 U.S.C. 154(b) by 1364 days.

(21) Appl. No.: 11/105,032

(22) Filed: Apr. 12, 2005

(65) Prior Publication Data
US 2005/0216942 A1    Sep. 29, 2005

Related U.S. Application Data

(63) Continuation-in-part of application No. 10/742,581, filed on Dec. 18, 2003, and a continuation-in-part of application No. 10/220,558, filed as application No. PCT/US01/06313 on Feb. 27, 2001.

(60) Provisional application No. 60/561,558, filed on Apr. 12, 2004, provisional application No. 60/434,767, filed on Dec. 18, 2002, provisional application No. 60/186,551, filed on Mar. 2, 2000.

(51) Int. Cl.
*H04N 7/16* (2011.01)
(52) U.S. Cl. ............... 725/142; 725/134; 725/153
(58) Field of Classification Search .............. 386/86; 725/39, 83, 93–94, 134, 142, 153
See application file for complete search history.

(56) References Cited

U.S. PATENT DOCUMENTS

| | | | |
|---|---|---|---|
| 5,151,782 A * | 9/1992 | Ferraro | ............... 725/66 |
| 5,883,901 A | 3/1999 | Chiu et al. | |
| 5,896,566 A | 4/1999 | Averbuch et al. | |
| 6,025,868 A | 2/2000 | Russo | |
| 6,040,851 A | 3/2000 | Cheng et al. | |
| 6,065,050 A | 5/2000 | DeMoney | |
| 6,247,176 B1 | 6/2001 | Schein et al. | |

(Continued)

FOREIGN PATENT DOCUMENTS
EP    A 977200    2/2000
(Continued)

OTHER PUBLICATIONS

State Intellectual Property Office of P.R.C., "Notification of the First Office Action", Application No. 200480038102.7, 8 pages.

(Continued)

*Primary Examiner* — Hunter B Lonsberry
(74) *Attorney, Agent, or Firm* — Hickman Palermo Truong Becker Bingham Wong LLP; Kirk D. Wong

(57) ABSTRACT

A method and apparatus for a multicasting multimedia content distribution system. A content server creates a schedule of transmission times for data streams and assigns the streams to multicast groups. DVRs receive the schedule from content server that contains content descriptions for each data stream along with the transmission times of each particular content description. The content server transmits the content across the Internet according to the published schedule via a multicast transmission designated for a particular multicast group. Each DVR determines the content for which it has an interest, finds the scheduled time for transmission for the content, schedules a recording time in its recording schedule, and joins the associated multicast group at the scheduled time. The DVR receives the multicast stream for the group and stores the stream on its local storage device for use by the DVR or for viewing by a user.

21 Claims, 30 Drawing Sheets

U.S. PATENT DOCUMENTS

| | | | |
|---|---|---|---|
| 6,275,850 | B1 | 8/2001 | Beyda et al. |
| 6,522,342 | B1* | 2/2003 | Gagnon et al. ............... 715/716 |
| 6,642,939 | B1 | 11/2003 | Vallone et al. |
| 6,754,885 | B1 | 6/2004 | Dardinksi et al. |
| 6,972,786 | B1 | 12/2005 | Ludwig |
| 7,113,994 | B1 | 9/2006 | Swift et al. |
| 7,908,635 | B2 | 3/2011 | Barton |
| 2002/0044656 | A1 | 4/2002 | Candelore |
| 2002/0059363 | A1 | 5/2002 | Katz et al. |
| 2002/0100052 | A1 | 7/2002 | Daniels |
| 2002/0104098 | A1* | 8/2002 | Zustak et al. ............... 725/131 |
| 2003/0033606 | A1 | 2/2003 | Puente et al. |
| 2003/0066093 | A1* | 4/2003 | Cruz-Rivera et al. ......... 725/146 |
| 2003/0093790 | A1 | 5/2003 | Logan et al. |
| 2003/0095791 | A1 | 5/2003 | Barton |
| 2003/0110503 | A1 | 6/2003 | Perkes |
| 2003/0118014 | A1 | 6/2003 | Iyer et al. |
| 2003/0122922 | A1 | 7/2003 | Saffer et al. |
| 2003/0145323 | A1 | 7/2003 | Hendricks et al. |
| 2003/0158958 | A1 | 8/2003 | Chiu |
| 2003/0204856 | A1 | 10/2003 | Buxton |
| 2003/0217328 | A1 | 11/2003 | Agassi et al. |
| 2004/0090970 | A1 | 5/2004 | Sanchez et al. |
| 2004/0109675 | A1 | 6/2004 | Tsukidate |
| 2004/0117483 | A1 | 6/2004 | Singer et al. |
| 2004/0163130 | A1 | 8/2004 | Gray et al. |
| 2004/0237100 | A1 | 11/2004 | Pinder et al. |
| 2004/0261093 | A1 | 12/2004 | Rebaud et al. |
| 2005/0028208 | A1 | 2/2005 | Ellis et al. |
| 2005/0076359 | A1 | 4/2005 | Pierson et al. |
| 2005/0108519 | A1 | 5/2005 | Barton |
| 2005/0108769 | A1 | 5/2005 | Arnold |
| 2005/0246752 | A1 | 11/2005 | Liwerant et al. |
| 2005/0289591 | A1* | 12/2005 | Vermola et al. ............... 725/45 |
| 2007/0036519 | A1* | 2/2007 | White .......................... 386/95 |
| 2011/0061071 | A1 | 3/2011 | Barton et al. |

FOREIGN PATENT DOCUMENTS

| | | |
|---|---|---|
| EP | A 0987888 | 3/2000 |
| JP | A 1999110401 | 4/1999 |
| JP | 2004/193920 | 7/2004 |
| WO | WO A 99/52278 | 10/1999 |
| WO | WO A 00/04549 | 1/2000 |
| WO | WO 01/53963 | 7/2001 |
| WO | WO 01/65862 | 7/2001 |
| WO | WO 01/10127 | 8/2001 |
| WO | WO 02/43353 | 5/2002 |
| WO | WO 2005/101411 A3 | 10/2005 |

OTHER PUBLICATIONS

Claims, Application No. 200480038102.7, 6 pages.
Australian Patent Office, "Written Opinion", application No. SG 200603866-5, 5 pages.
Claims, application No. SG 200603866-5, 6 pages.
EPO International Search Report, Application No. 04814401.8 (3 pgs), Mar. 9, 2007.
International Search Report, application No. PCT/US05/12483 dated Oct. 3, 2008—(2 pgs).
Written Opinion of ISR, application No. PCT/US05/12483 dated Oct. 3, 2008—(4 pgs).
State Intellectual Property Office of P.R.C., "Notification of the First Office Action", Application No. 200580039507.7, dated Mar. 27, 2009, 8 pages.
Claims, Application No. 200580039507.7 as of Mar. 27, 2009.
Australian Patent Office, "Examination Report", application No. 2005306361, dated Apr. 22, 2009.
Claims, Application No. 2005306361, as of Apr. 22, 2009.
European Patent Office, "Communication Pursuant to Article 94(3) EPC", Application No. 01913128-3-1241, dated Oct. 7, 2009, 7 pages.
Claims, Application No. 01913128-3-1241, 5 pages.
Canadian Intellectual Property Office office action, mailed Nov. 3, 2009, Canadian application No. 2,588,630, 5 pages.
Current Claims for Canadian application No. 2,588,630, 7 pages.
State Intellectual Property Office, People'S Republic of China Notification of the First Office Action, English Translation for Chinese Patent Application No. 200580015814.1, mailed May 12, 2010, 7 pages.
Pending claims as of May 12, 2010 for Chinese Patent Application No. 200580015814.1, 4 pages.
Japan Patent Office Notification of Reasons for Refusal, English Translation for Japanese Patent Application No. 2007-508490 mailed Oct. 13, 2010, 3 pages.
Pending claims as of Oct. 13, 2010 for Japanese Patent Application No. 2007-508490, 10 pages.
Japanese Action received in Application No. 2007-543364 dated Nov. 15, 2011 (4 pages).
Current Claims in Japanese Application No. 2007-543364 dated Nov. 2011 (9 pages).
Chinese Office Action received in Application No. 200580041645.9 dated Nov. 24, 2011 (9 pages).
Current Claims of Chinese Application No. 200580041645.9 dated Nov. 2011 (11 pages).
International Bureau of WIPO Notification Concerning Transmittal of International Preliminary Report on Patentability for International Application No. PCT/US2005/012483 mailed Mar. 12, 2009, 5 pages, Geneva, Switzerland.
International Searching Authority/EPO Invitation to Pay Additional Fees (with a Partial International Search) for International Application No. PCT/US01/06313 mailed Oct. 15, 2001, 6 pages, Rijswijk, Netherlands.
International Searching Authority/EPO Notification of Transmittal of the International Search Report for International Application No. PCT/US01/06313 mailed Jan. 14, 2002, 7 pages, Rijswijk, Netherlands.
International Preliminary Examining Authority Notification of Transmittal of International Preliminary Examination Report for International Application No. PCT/US01/06313 mailed Jan. 17, 2003, 18 pages, IPEA/US, Washington, D.C. USA.
Office Action received in European application No. 11182065.0 dated Dec. 16, 2011 (9 pages).
Current Claims of European application No. 11182065.0 dated Dec. 2011 (3 pages).
Baker, Fred, "Requirements for IP version 4 Routers," RFC 1812, Jun. 1995, 140 pages.
Ballardie, A., "Core Based Trees (CBT version 2) Multicast Routing," RFC 2189, 18 pages.
Ballardie, A., "Core Based Trees (CBT) Multicast Routing Architecture," RFC 2201, Sep. 1997, 13 pages.
Braudes, R. et al., "Requirements for Multicast Protocols," RFC 1458, May 1993, 16 pages.
Daviel, Andrew, "Linux Multicast FAQ—May 10, 1995," located on the internet at http://andrew.triumf.ca/pub/linux/multicast-FAQ, 2 pages.
Deering, Steve, "Host Extension for IP Multicasting," RFC 1112, Aug. 1989, 13 pages.
Estrin, D. et al., "Protocol Independent Multicast-Sparse Mode (PIM-SM): Protocol Specification," Jul. 1997, 50 pages.
Fenner, W., "Internet Group Management Protocol, version 2," RFC 2236, Nov. 1997, 18 pages.
Katz, D., "Transmission of IP and ARP over FDDI Networks," RFC 1390, Jan. 1993, 9 pages.
Maufer, T. et al., "Introduction to IP Multicast Routing," Network Working Group, Internet Draft date Jul. 1997, 40 pages.
Meyer, David, "Administratively Scoped IP Multicast," MBONED Working Group, Internet Draft, Jun. 1997, 7 pages.
Moy, John, "Multicast Extensions to OSPF," Mar. 1994, 76 pages.
Moy, John, "OSPF Version 2," RFC 1583, Mar. 1994, 156 pages.
Moy, John, "MOSPF: Analysis and Experience," RFC 1585, Mar. 1994, 10 pages.
Pusateri, T., "IP Multicast over Token-Ring Local Area Networks," RFC 1469, Jun. 1993, 4 pages.
U.S. Appl. No. 12/651,339, filed Dec. 31, 2009, Office Action, mailed Oct. 7, 2011.

U.S. Appl. No. 12/704,245, filed Feb. 11, 2010, Office Action, mailed Oct. 7, 2011.
U.S. Appl. No. 12/651,339, filed Dec. 31, 2009, Final OA, mailed Nov. 29, 2011.
U.S. Appl. No. 12/910,741, filed Oct. 22, 2010, Office Action, mailed Dec. 21, 2011.
U.S. Appl. No. 10/742,581, filed Dec. 18, 2003, Corrected Notice of Allowance, mailed Feb. 14, 2012.

U.S. Appl. No. 11/285,411, filed Nov. 21, 2005, Office Action, mailed Jun. 2, 2010.
U.S. Appl. No. 10/741,596, filed Dec. 18, 2003, Office Action, mailed Feb. 1, 2012.
U.S. Appl. No. 10/741,596, filed Dec. 18, 2003, Office Action, Jun. 3, 2008.

* cited by examiner

|  | 901 ↓ | 905 |  |
|---|---|---|---|
| name 902 | 903 | 904 | 906 |
| Bedroom1 | System 1 serial # | System 1 public key | |
| Living room | System 2 serial # | System 2 public key | |
|  |  |  |  |
|  | System n serial # | System n public key | |
|  | Expiration date | Digital signature | |
|  | 907 | 908 | |

Fig. 9

MULTICASTING MULTIMEDIA CONTENT DISTRIBUTION SYSTEM

CROSS-REFERENCE TO RELATED APPLICATIONS; PRIORITY CLAIM

This application claims benefit of Provisional Appln. 60/561,558, filed Apr. 12, 2004, the entire contents of which is hereby incorporated by reference as if fully set forth herein, under 35 U.S.C. §119(e). This application also claims benefit as a Continuation-in-part of application Ser. No. 10/742,581, filed Dec. 18, 2003, which further claims benefit of Provisional Appln. 60/434,767, filed Dec. 18, 2002, the entire contents of which is hereby incorporated by reference as if fully set forth herein, under 35 U.S.C. §120, and is a Continuation-in-part of application Ser. No. 10/220,558, filed Aug. 29, 2002, which is a national stage entry of PCT/US01/06313, filed Feb. 27, 2001, the entire contents of which is hereby incorporated by reference as if fully set forth herein, under 35 U.S.C. §371, which further claims benefit of Provisional Appln. 60/186,551, filed Mar. 2, 2000, the entire contents of which is hereby incorporated by reference as if fully set forth herein, under 35 U.S.C. §120.

FIELD OF THE INVENTION

The invention relates to distributing multimedia content across a network to a plurality of digital recorders.

BACKGROUND

With the advent of videocassette recorders (VCRs), TV viewers are able to record TV program events that are broadcasted in a given time slot and playback the recorded program content later. During the recording, a VCR changes the electrical signals of a program's content into magnetic signals and stores the magnetic signals on magnetic tape. When playing back, the VCR changes magnetic signals into electrical signals and an attached TV set displays the program content of the signals on its screen.

VCRs are quickly being superseded by digital video recorders (DVRs) with the development of digital technology. Like a VCR, the functionality of a DVR is to record broadcasted program events for later playback. During recording, a DVR changes the electrical signals of broadcast program content into digital information, such as MPEG data streams, and stores the digital information on a memory device or directly stores pre-digitized TV signals on the memory device. When playing back, the DVR converts the digital information back to analog or digital display signals. An attached TV set or monitor displays the program content of the signals on its screen.

A traditional DVR is a single-purposed system dedicated to recording broadcast TV program content. It does not have the ability to receive multimedia content in any other manner except via terrestrial, cable, or satellite connections. What is desired is to provide a DVR with the ability to receive multimedia content via a network connection such as the Internet, giving the DVR an additional source of content. The content does not have to be received or displayed in real-time, as with broadcast TV program content. Additionally, such a system would provide a method to efficiently broadcast multimedia content to multiple DVRs across the network without overloading a content server.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is a diagram illustrating a digital certificate containing DVR information;

DETAILED DESCRIPTION

A method and apparatus for a multicasting multimedia content distribution system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

A. System for Remote Access to a Personal TV Service

Figure 1:
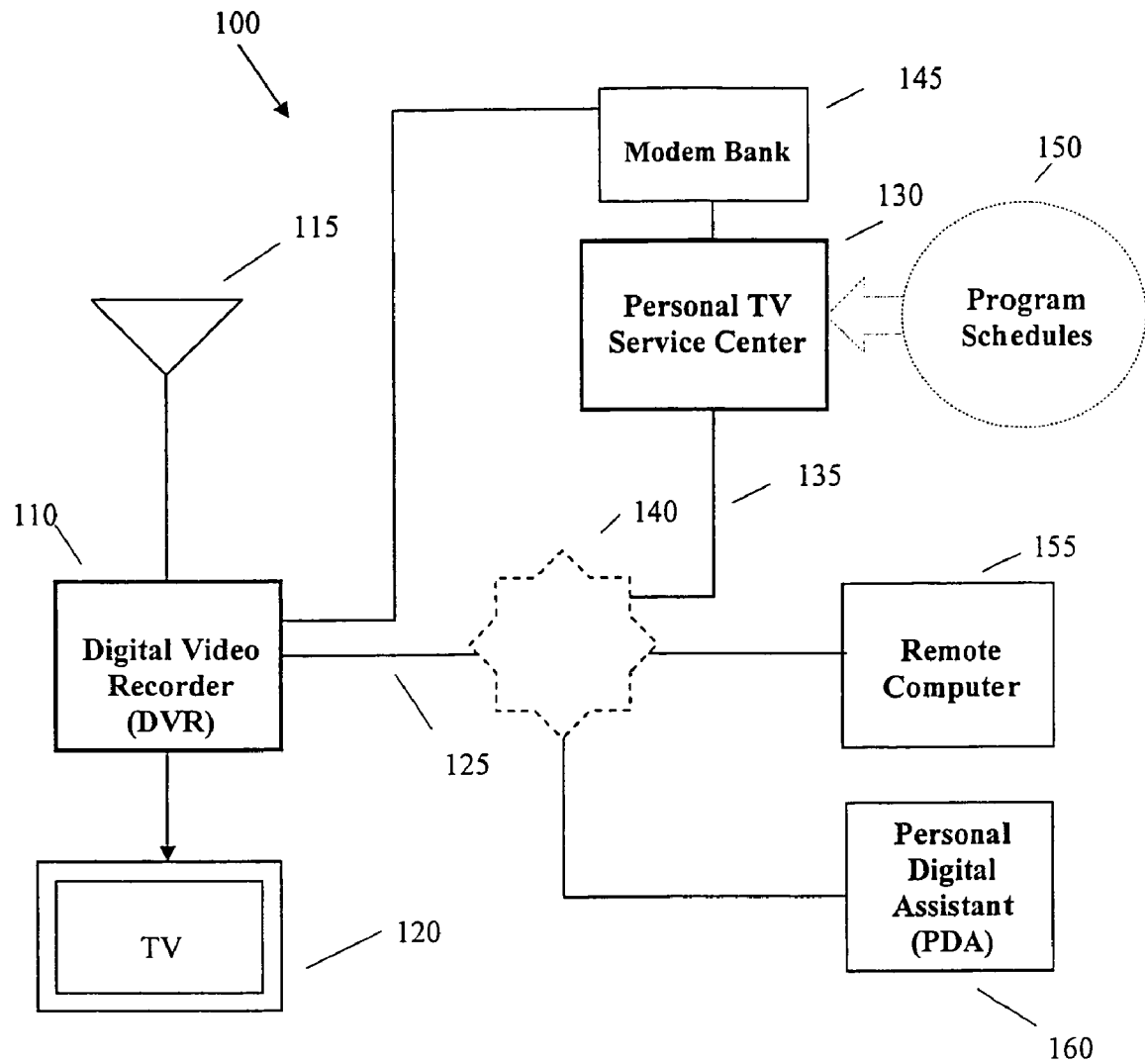
FIG. 1 is a block diagram illustrating a communication system for remote access to a centralized personal television service.

Referring to FIG. 1, a communication system for remote access to a personal TV service is shown, generally designated as 100. In accordance with one approach, a digital video recorder (DVR) 110 installed in a household communicates with a personal TV service center (hereinafter referred to as service center) 130, which provides program guide data, graphical resources (such as fonts, pictures, etc.), service information, and other forms of data that enable the DVR 110 to operate independently of the service center 130 to satisfy viewer interests. The functionality of a DVR is typified in U.S. Pat. No. 6,233,389, patent application Ser. Nos. 09/827,029, 09/935,426, 10/081,776, 10/418,646, and 11/051,347, all of which are owned by the Applicant and are hereby incorporated by reference. The communication system uses a secure distribution architecture to transfer data between the DVR 110 and the service center 130 such that both the service data and the user's privacy are protected. The DVR 110 receives broadcast signals from an antenna 115 or receives television signals from a cable TV system.

In one embodiment of the invention, the DVR 110 generally comprises: a plurality of components that are necessary to digitize an analog television signal and convert it into a digital data stream; a plurality of components that are designed to record segments of said data stream; a plurality of storage facilities that are designed to retain segments of said data stream; a plurality of components that are designed to retrieve segments of said data stream, convert said data stream into an analog signal, and then modulate the signal onto a RF carrier, through which the signal is delivered to a standard TV set 120; and an interface 125, through which the DVR 110 communicates with a network 140.

The DVR 110 contains a local secure crypto chip that that contains a non-alterable private key. The DVR 110 secure functionality is further described in U.S. Pat. No. 6,385,739 which is owned by the Applicant and is hereby incorporated by reference.

The DVR 110 may be directly connected to the service center 130 by using its internal telephone modem to dial into an incoming call modem bank 145. The incoming call is first routed to the service center 130 for identification verification. Upon verification, the incoming call is authorized. The private modem bank 145 answers the call and the DVR 110 is granted access to the databases in the service center 130.

Alternatively, the DVR 110 may be indirectly connected to the service center 130 via the network 140. The interface 125 between the DVR 110 and the network 140 may be the internal telephone modem of the DVR 110, or a dedicated network interface such as a cable modem. The computer network 140 can be either a private network or the Internet. The DVR 110 initiates a connection to the computer network 140 by calling a local access telephone number for an Internet service provider (ISP). The ISP directs the network connection request to the service center 130 for identification verification. Upon verification, the network connection is authorized and the DVR 110 is granted access to the databases in the service center 130.

The service center 130 receives program schedule information 150 from external sources. The program schedule information 150 forms the basis of a program guide that TV viewers can use to select TV programs to be recorded. The service center 130 communicates with the computer network 140 through an interface 135.

TV viewers can use a remote computer 155 or personal digital assistants 160 to remotely access the program database in the service center 130 by establishing a communication channel with the service center 130 via the computer network 140.

Figure 2:
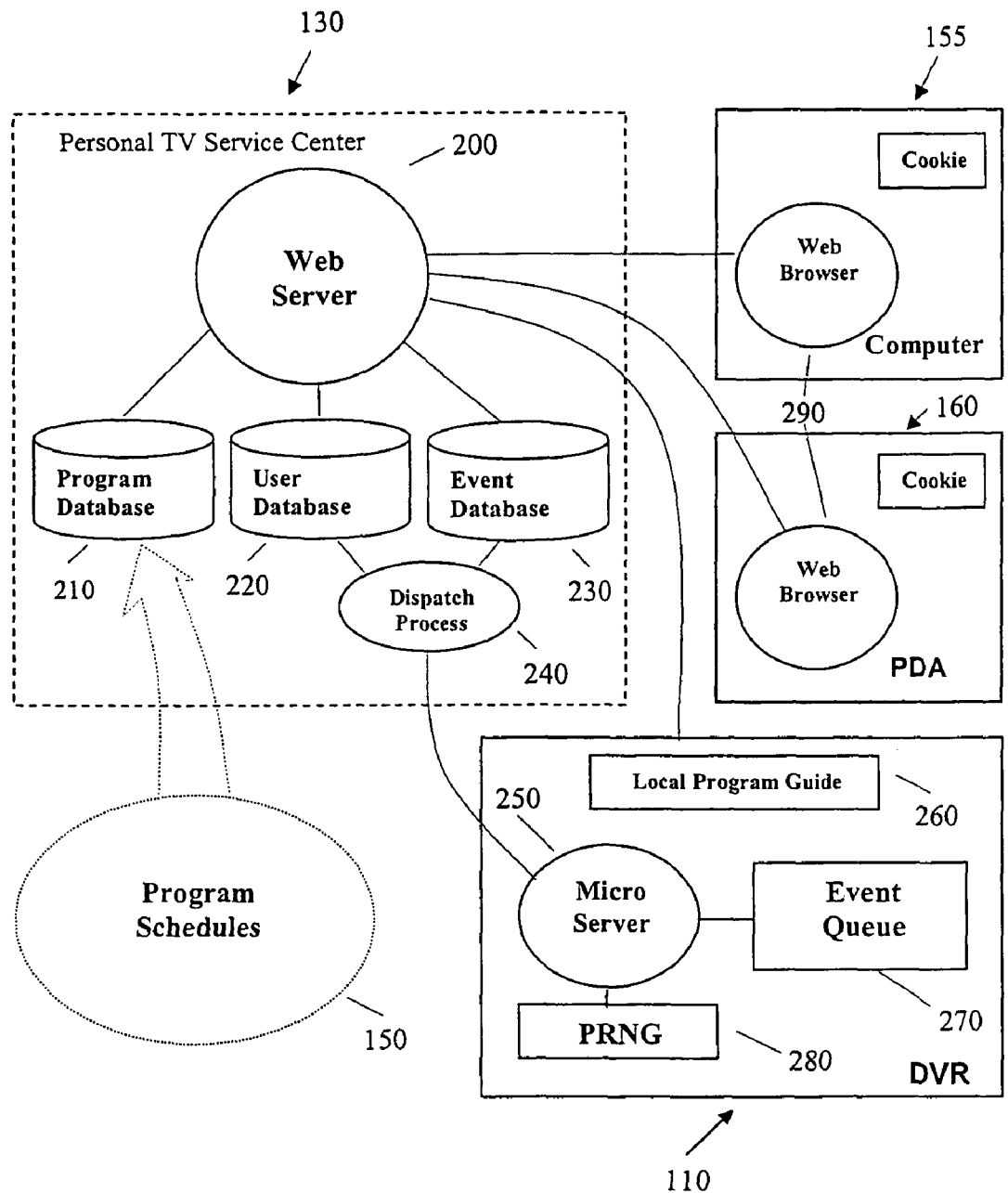
FIG. 2 is a data flow diagram showing the operational processes of the system shown in FIG. 1.

Referring to FIG. 2, the service center 130 includes a Web server 200, which collects, organizes, and provides program schedule information; a program database 210, which stores program schedule information; a user database 220, which stores information about users and digital video recorders; an event database 230, which stores an event list for each user, and a dispatch process 240, which traverses the user database and retrieves the event list from the event database. It may also include a network interface over which the Web server and the digital video recorder communicate.

In one embodiment, the DVR 110 includes a micro-server 250, which controls the communication between the DVR 110 and the service center 130; a local program storage guide 260, which records the program guide provided by the service center 130 and is updated whenever the DVR 110 accesses the service center 130; an event queue 270, which is a data structure used to initiate recording sessions that capture selected TV programs; a pseudo-random-number-generator (PRNG) 280, which generates an authorization key for remote access; as well as a network interface 125, which connects the DVR 110 to the computer network 140. The event queue 270 is coupled to a recording device integral to the DVR 110.

Both the remote computer 155 and the personal digital assistants (PDA) 160 comprise a Web browser 290, which may be a generic Web browser that enables the user to view Web pages.

Figure 3:
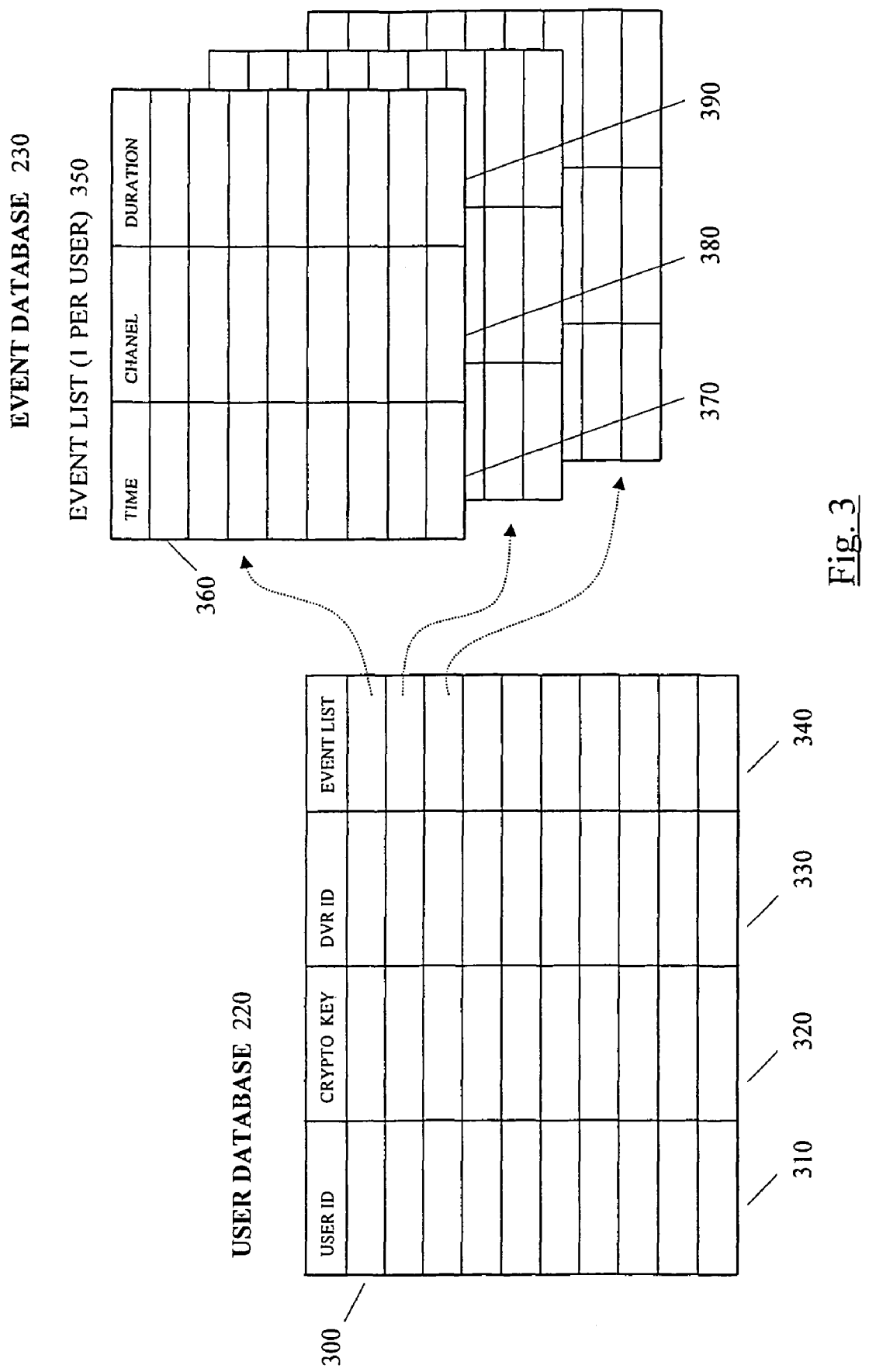
FIG. 3 is a table diagram illustrating the structures of a user database and an event database shown in FIG. 2.

FIG. 3 is a table diagram illustrating the structures of a user database 220 and an event database 230. The user database 220 includes a plurality of user records 300. Each user record 300 comprises a plurality of fields, among which are a user identification 310, a crypto-key 320, a DVR identification 330, and an event list pointer 340. The user identification field 310 is used as a key into the user database 220. The crypto-key field 320 is used to store the authorization key received from a user who is attempting to program his DVR 110 remotely. The DVR identification 330 is used to store the network address and connection details which are needed to establish a communication channel with the DVR 110.

In the user database 220, separate event lists 350 are maintained for each user. The event lists 350 are stored in the event database 230. Each event list 350 includes a plurality of event records 360. Each event record includes a plurality of fields among which are a time field 370, a channel field 380, and a duration field 390. The time field 370 is used to indicate a start time for recording and is comprised of the date and time of the program event. The channel field 380 specifies which channel the DVR should record. The duration field 390 is used to specify how long the DVR should record the content for that program event. An event record can also contain an ID of a record (or object) in the program guide database. The DVR retrieves necessary information from the program guide database.

B. Process for Remote Access to Personal TV Service

FIG. 2, together with FIG. 1, shows various processes that collectively enable the functionality of the techniques described herein.

The service center 130 receives program schedule information 150 from external sources on a periodic basis. Once the program schedule information 150 arrives, the program database 210 is updated accordingly.

The DVR 110 updates its local program guide 260 on a periodic basis by reading a Web page from the Web server 200 or via cable, satellite, or telephone. In response to a request from the DVR 110, the Web server 200 first consults the program database 210 for updated program information and then dynamically creates a Web page containing updated program schedule information.

Figure 5:
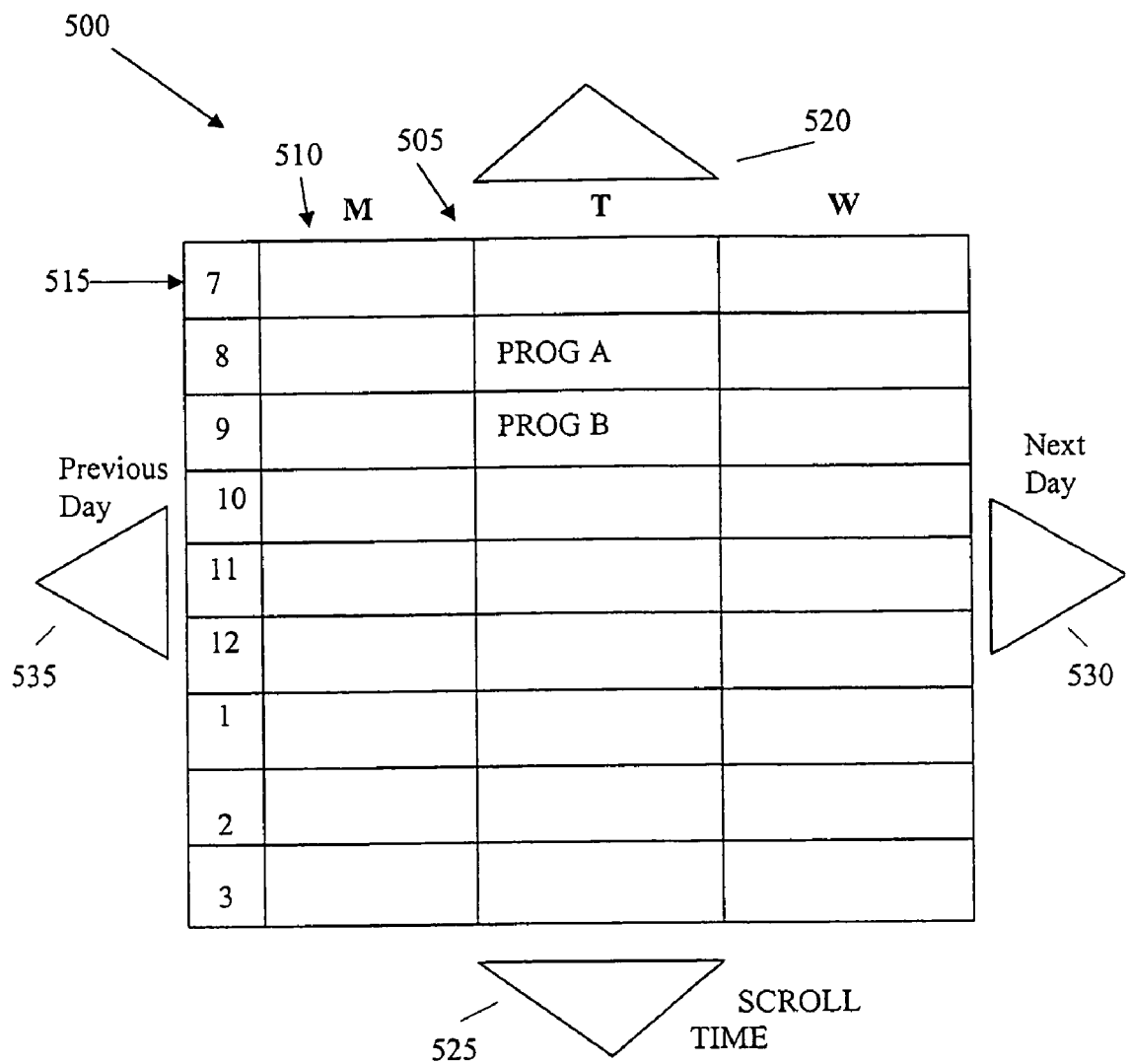
FIG. 5 is a pictorial representation of a graphical user interface for program selection.

Two types of remote access are available: direct and indirect. The TV viewer can indirectly program the DVR 110 by using a Web browser 290 on either a remote computer 155 or a personal digital assistant 160. In this situation, the Web browser 290 is used to access a special Web site hosted by the Web server 200. The Web server 200 presents to a TV viewer a program guide using a graphical user interface as shown in FIG. 5. The TV viewer selects TV programs by program title and time slot to indicate what programs should be recorded by the DVR 110.

The service center 130 executes a dispatch process 240 on a periodic basis. The dispatch process 240 traverses the user database 220. Whenever the dispatch process 240 encounters a user who has specified program events, the dispatch process 240 retrieves the event list 350 from the event database 230. The dispatch process 240 then establishes a communication channel with the micro-server 250 that resides in the DVR 110. This communication channel is designed to allow the dispatch process 240 to retrieve a special event-dispatch Web page from the micro-server 250. The micro-server 250 presents the event-dispatch Web page to the dispatch process 240. The dispatch process 240 then completes the event-dispatch Web page and submits it back to the micro-server 250.

The micro-server 250 can also cause the dispatch process 240 to start the event transfer by polling the dispatch process 240 for events.

The micro-server 250 uses event directives found in the event-dispatch Web page to update the event queue 270 integral to the DVR 110. The event queue 270 is a data structure used by the DVR 110 to initiate recording sessions that capture TV program events.

In order to authenticate a transaction, the Web server 200 includes one or more authorization codes for the user affiliated with the DVR 110 to be programmed. The DVR 110 compares the authorization code against a private copy maintained in the DVR's non-volatile memory. The authorization codes are time sensitive and can be set to expire as system security requirements dictate.

To use the direct remote access feature, a user must first obtain an authorization key from the DVR 110, which is generated by the pseudo-random-number-generator (PRNG) 280. The user communicates directly with DVR 110 via his television at the DVR's location. The DVR 110 presents the authorization key to the user. The user later accesses the DVR 110 through the Internet using his computer 155 or his PDA 160. The user presents the authorization key and programs the DVR 110 through a graphical user interface that is managed by the micro server 250. Also, once the user has access in direct mode, the user can download a program to the DVR 110.

C. Process to Obtain Remote Programming Directives

Figure 4:
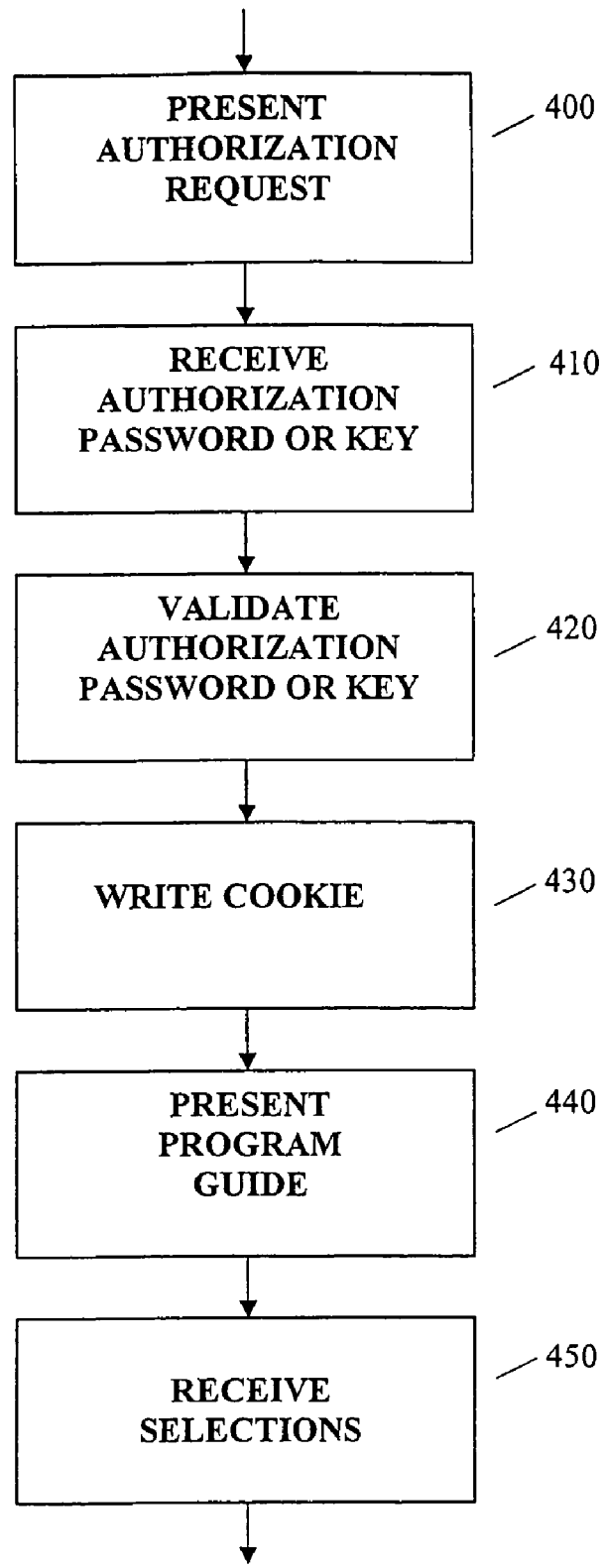
FIG. 4 is a flow chart showing a process used by a personal TV service's Web server to obtain remote programming directives from a user.

FIG. 4 is a flow chart showing a process used by the Web server 200 and micro server 250 to obtain remote programming directives from a user. Both are presented in parallel, but in normal use are separate processes. The process includes the steps of:

Step 400: The Web server 200 or micro server 250 presents an authorization request form in the first Web page to the user who accesses a special Web site that is managed by the Web server 200 or the micro server 250;

Step 410: The Web server 200 receives an authorization password entered by the user; the micro server 250 receives an authorization key from the user;

Step 420: The Web server 200 validates the authorization password using the user database 220; the micro server 250 validates the authorization key with the key that it has stored.

Step 430: Once the Web server 200 has validated the authorization password in the user database 220, it writes a cookie in the non-volatile memory of the remote computer 155 or personal digital assistant 160; once the micro server 250 has validated the authorization key, it writes a cookie in the non-volatile memory of the remote computer 155 or personal digital assistant 160;

Step 440: The Web server 200 or micro server 250 presents a program guide to the user after the user is identified and authenticated;

Step 450: The Web server 200 receives the user selections and creates an event list 350 specific to the user. The event list 350 is stored in the event database 230. The micro server 200 receives the user selections and places them on the event queue 270.

In Step 440, the Web server 200 or micro server 250 follows a script integral to the first Web site presented to the user and searches for a valid cookie on the remote computer 155 or the personal digital assistant 160. Once a valid cookie is discovered, steps 400 through 430 are excluded from the process flow.

D. Graphical User Interface for Program Selection

Figure 6:
FIG. 6 is a screen capture of a Now Showing Web page that appears in a user's web browser or television screen.

FIG. 5 is a pictorial representation of an exemplary graphical user interface (GUI) 500 for program selection. The GUI 500 is used both on the DVR front panel and is incorporated into the Web pages presented to remote users by the Web server 200. When implemented directly in the DVR 110, the GUI 500 is manipulated directly by the control process integral to the DVR 110. When the GUI 500 is presented to the remote users via a computer network, it embodies as an active server Web page. FIG. 6 is a screen capture of the Now Showing Web page that appears in a user's web browser.

The GUI 500 comprises a table 505 that contains a plurality of columns 510 and a plurality of rows 515. The columns 510 correspond to the days of the week (and a specific calendar date). The rows 515 correspond to the hours of a given day. The columns 510 and rows 515 of the table 505 are actually made up of data selection controls where the caption of the control is set to indicate the title of a TV program that is scheduled in the time slot according to the position of that control in the table 505. The GUI also comprises a mechanism for scrolling up 520 and scrolling down 525, a mechanism for turning forward 530 and turning backward 535; a mechanism for selecting a specific TV program; a mechanism for creating a program event list 350 which contains selected TV programs; and a mechanism for editing said event list 350. In addition, it may also include a mechanism for commanding download, a mechanism for indicating the download is in progress, and a mechanism for canceling the ongoing download.

The position of the control corresponds to the day and hour of the TV program event. The user can toggle the selection controls that are presented in the GUI 500. When the GUI 500 is returned to the Web server 200, the identifiers of the selected controls are used in conjunction with the program guide 260 to create an event list 350 for the user. The event list 350 is then stored in the event database 230 in the case of remote programming. For local programming of the DVR 110, the event list 350 is stored directly in the event queue 270 that controls the DVR recording sequence.

E. Internet Access to Digital Video Recorder

Figure 7:
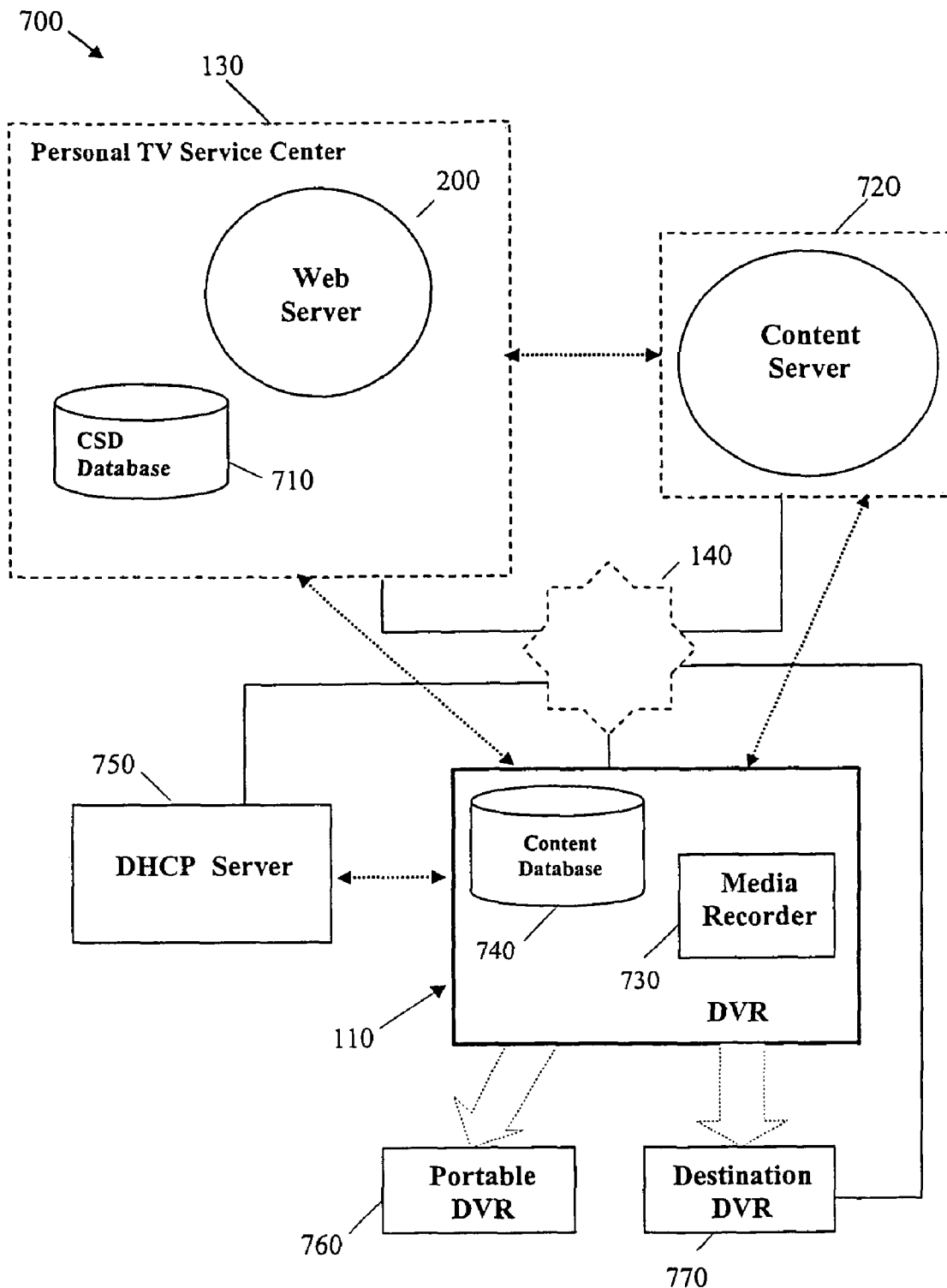
FIG. 7 is a block diagram illustrating the interactions among the personal TV service center, the DVR, and the external content server over Internet.

FIG. 7 is a block diagram of a general scheme 700 illustrating the interactions among the service center 130, the DVR 110, and the external content server 720 over the Internet, wherein a particular style of the Internet access is integrated into the DVR 110 to enable it to fetch certain types of content over an Internet connection 140 and make them available for viewing in the Now Showing page as shown in FIG. 6. For purposes of illustrating a clear example, FIG. 7 and the description herein refers to specific elements and protocols that may be used in an implementation, such as the Internet, Linux, DHCP, etc. However, other functionally similar elements or protocols may be used in alternative implementations. For example, downloading may occur through any public, private, or dedicated network rather than the Internet. Other operating systems and dynamic addressing protocols may be used.

In a Now Showing page, a listing of the content name, i.e., the title of TV program, indicates that such content is being fetched on the GUI 500, and a record icon, or some variant thereof, indicates that the download is in progress. The viewer may pick the content (i.e., the TV program) and play it at any time.

Figure 8:
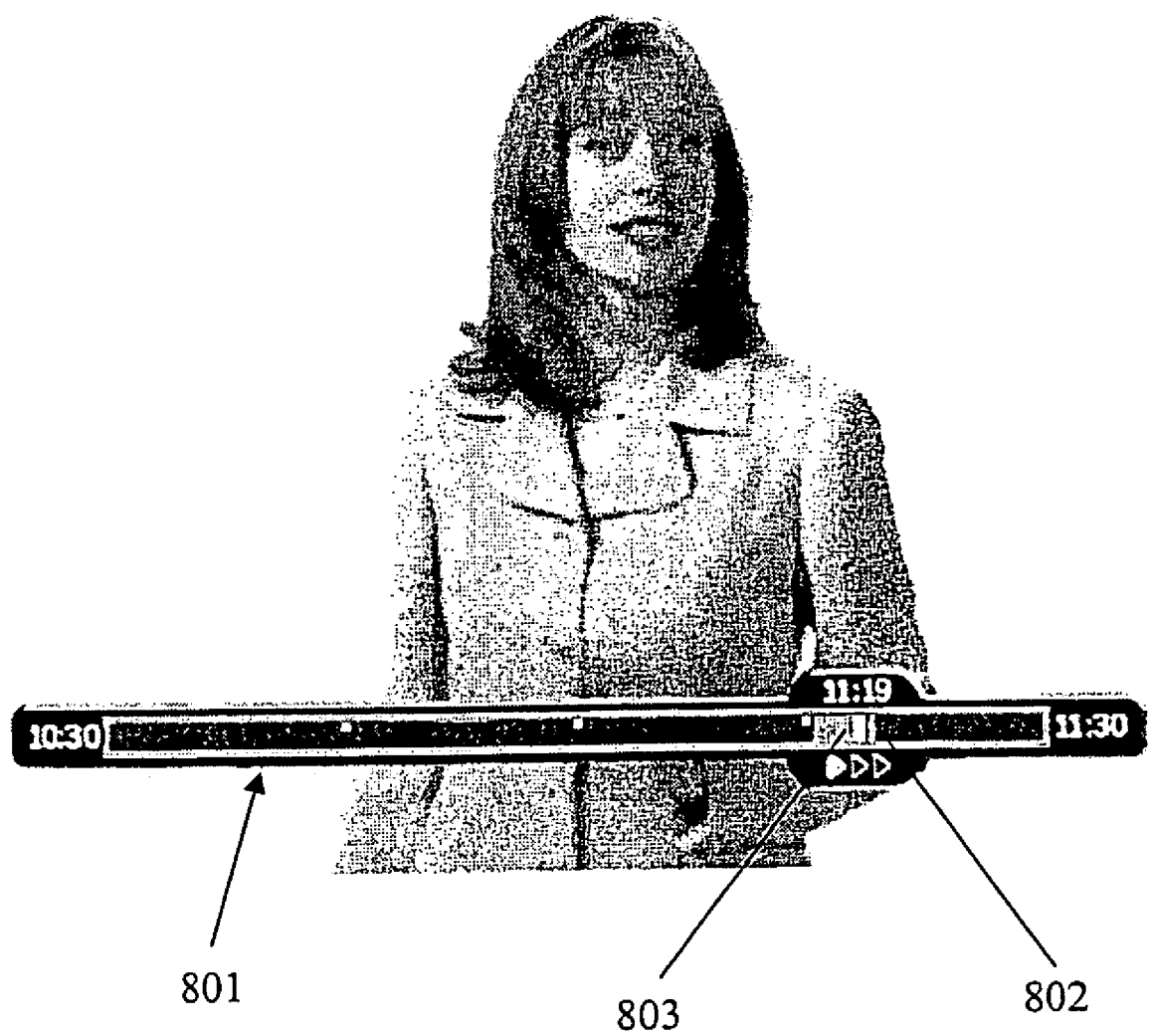
FIG. 8 is a screen capture of a replay bar indicating that the content is downloading faster than playback speed.

The download may occur at any speed. Thus, the interface 125 in FIG. 1 is not dependent in any way on speed of download. FIG. 8 is a screen capture of the Web page showing a replay bar 801 that, by growing the green region 802 to match, indicates that the content is downloading faster than playback speed 803. Other mechanisms than such a replay bar 801 may be used to indicate that content is downloading faster than playback speed. In any case, the viewer is able to use all trick-play actions on whatever amount of content has been downloaded to that point.

The fact that the content was downloaded over the Internet is transparent to the viewer, except in the context of presenting program information, where an indication that the content is from the Internet may be made in various ways.

Pointers to downloaded content are stored in a local content database 740 on the DVR 110 hard drive in an analogous manner to how broadcast programs are stored, such that all forms of searching and presentation properly display those programs and provide for their manipulation.

In channel or network oriented contexts, downloadable programs are presented in a manner analogous to broadcast programming. These contexts may have to be modified such that the channel or network "lineup" is presented in a sensible manner, since time and location are irrelevant for such programs.

The number of content items available in the Now Showing context as shown in FIG. 6 may make navigation unwieldy. Although not required for the initial implementation, this context may be modified to make navigation of many items simpler.

The entity providing the content from some servers may be viewed as a television network. Each unique server name indicates a channel. Here, a "server" is just a name on the network; it might map into any physical server anywhere in the world.

Once the content server 720 is contacted, the DVR 110 requests the media content according to the program identification given. This is mapped by the Web server 200 into a particular piece of content, which is then sent down the connection. Either the content server or the DVR may throttle the download speed.

If the viewer requests multiple downloads, the DVR 110 may choose several different ways to get the content; it may initiate multiple connections with a maximum limitation, or queue requests, or both.

In one approach, elements of FIG. 7 address security of the DVR 110. Opening up a network port leads to a large number of possible security breaches, revolving around the security of copyrighted content and protection of a customer's private data.

In one embodiment, standard Linux firewall support is used to manage this protection by automatically blocking access to all but a few, well-known ports (such as Web (HTTP) or discovery) in both directions of communication. The well-known ports are used by the application software of the DVR to contact the external content server 720 for downloading media content.

A dynamic addressing client software element, such as the Linux DHCP client, is provided in the DVR 110. On boot up of the DVR, if a network interface is detected, then the DHCP client uses the well-known port to obtain a network address for the DVR from a source of dynamic addresses. For example, the DHCP client of DVR 110 uses the DHCP protocol to poll for an external DHCP server 750. If no server is found, networking will be disabled. Otherwise, the DVR 110 will initialize its network parameters from the DHCP response.

One issue with such Linux firewall support is that the external DHCP server 750 is required to configure the Internet access information. It is well known that there are a large number of methods for reading data or redirecting the data flow on an Internet connection between two devices. One possibility is aliasing, in which a malicious DHCP server configures Internet access information in a way that enables a malicious host to enter and attack the DVR by using an alias server address.

To defeat attacks of this nature, in one embodiment all communication with the content server 720 is authenticated and encrypted. The content server 720 has access to the public key of the DVR 110, and the DVR has a copy of the public key of the content server 720. The DVR 110 has metadata content information about the content server 720 downloaded by the service center 130. The DVR 110 stores the metadata in its database 740 and relies on the data in the database 740 to operate. Using a certificate exchange, the DVR 110 and the content server 720 generate a one-time session key, and all further communication are encrypted using the session key. In one embodiment, the Blowfish algorithm is used for encrypted session communication. The public key of the content server 720 is distributed from the service center 130, which has also provided appropriate program guide references to the content server 720.

The service center 130 accepts descriptions of the content server 720. In one embodiment, such descriptions consist of server URLs, content descriptions, content identifications, "channel" descriptions, "network" descriptions, etc. These data are imported into a content server's description (CSD) database 710. A set of public keys for access to the content server 720 are also provided.

In order for the content server 720 to accept a connection from the DVR 110, it must have access to the public key for a particular DVR. This key distribution may be performed on-the-fly, or through a pre-shared key distribution approach. In on-the-fly key distribution, the content server 720 establishes an authenticated connection to the service center 130, provides a DVR serial number, and requests the service center 130 to provide the associated public key. Given a DVR serial number, the service center 130 returns an associated public key. The content server 720 may cache this public key. Each key has an expiration date that indicates when the content server 720 must delete the key. The service center 130 may maintain a log of all distributed public keys, for example, for the purpose of auditing key distribution.

The service center 130 may refuse to provide the public key of an inactive DVR. Additionally, the content server 720 may respond to key invalidation requests from the service center 130, for instance, if a particular DVR becomes inactive.

A media recorder 730 is a subsystem of the personal TV service application software of DVR 110. Media recorder 730 allows for simultaneous record and playback of the downloading content. The recorded content is stored in the content database 740 of DVR 110. The media recorder 730 will not be started if no permanent network connection is available. In one implementation, media recorder 730 comprises a number of different threads.

(1) Recording Queue Thread: This thread manages a queue of network download requests and implements the download policy. Initially, this may be a simple FIFO queue maintained in the database. A recording queue policy object is maintained once the download policy is implemented.

(2) Fetch Recording Thread: This thread is responsible for managing a connection with the content server 720. The Fetch Recording Thread contacts the server, implements the authentication protocol, requests the desired content, and manages download of the content.

As a variation on this strategy, a program object within the personal TV service application or media recorder 730 may indicate multiple servers to be polled for the media content. The servers are polled in order by the Fetch Recording Thread; the first to accept a request for download is used. This provides for load-balancing content requests across a plurality of content servers organized in a server farm or data center.

The Fetch Recording Thread periodically stores or checkpoints its state to an database in DVR 110. Such checkpointing allows restart of a download after a power failure or system error at the same point in the multimedia content at which download was occurring when the failure or error happened. The Fetch Recording Thread also manages the state of database objects that are used for presentation and navigation of the content being downloaded. For example, the Fetch Recording Thread manages the state of the recording object for proper display in the Now Showing context as shown in FIG. 6. There may be one or more such threads active at any point in time.

F. DVR to DVR Interactions

In one approach, a mechanism for transferring media and database elements between two DVRs is provided. Referring to FIG. 7, one example of a transfer is shown using a smaller amount of disk storage as provided in a portable DVR 760, for example. As an example, before going on vacation, a user may transfer desirable media and the invisible associated service data to the portable DVR 760 and take the portable DVR 760 along such that the media may be used when desired. Another example of a transfer is shown using two DVRs, DVR 110 and DVR 770, that are slaved together such that two media streams are played with precise synchronization to achieve identical operation.

There are many ways to connect two DVRs. In one embodiment, the output of the source DVR 110 is coupled into the input of the destination DVR 770. While this method is functional, this method fails to transfer metadata information about the media stream, which is essential to viewer satisfaction in managing and using the media stream.

The media stream stored in the DVR 110 consists of the media content itself, and a database object which provides descriptive information about the media content. If a data transfer method is used, such as a network (e.g., IEEE 802.3) or a direct connection (e.g., IEEE 1394), then both the media content and the descriptive information can be transferred, such that the integrity of the viewer experience is preserved.

Content owners are concerned about potential theft of their content. A further approach encrypts the data transfer between the DVRs 110 and 770. This can be done in a number of standard and custom ways. For instance, the Diffie-Hellman secure connection protocol may be used to generate a one-time key that is then used to encrypt the transfer.

If it is desirable to allow the transfer to only occur to certain specified DVRs, an integrated security system may be used. The public key of each DVR is known to the other, either through pre-sharing keys or a dynamic exchange of keys. When the transfer is started, the DVRs exchange signed certificates that are encrypted based on the public key of the other DVR. If both DVRs can decrypt and verify the signature of the other, then each DVR has authenticated the other's identity and can proceed to establish a one-time session key that is then used to encrypt the data during the transfer.

Key distribution in such a case may be handled through the service center 130. A viewer may contact the service center 130, and request that two DVRs 110 and 770 he owns be authorized for data transfer between each other. The service center 130 sends an authorization object containing each DVR's public key to the other DVR through an appropriate download mechanism. The service center 130 maintains a record of this operation for later auditing purposes, which includes identifying information for each DVR. For instance, should the security system be defeated in one DVR and the public key of the other be exposed, it is possible to modify other DVRs such that they appear authorized to the source DVR 110. Each DVR keeps a record of the transfers. This record is uploaded to the service center 130. Later, this information could be processed to look for copy protection violations, copies to unauthorized DVRs, etc.

If the transfer is interrupted, the destination DVR 770 marks the media stream as "partial" in the descriptive object. Later, the transfer may be restarted. Since the design of the database system guarantees the media stream can be uniquely identified on the destination DVR 770, the partial stream is found, and the transfer begins from its end, thus avoiding re-transfer of media that has already been stored. Once the entire media stream is stored, the descriptive object is updated to show a complete media stream.

Transferring digital data between the DVRs may take place at whatever speed is appropriate. For instance, it may be the case that the network between the DVRs is slow, in which case the transfer duration will be longer than the playback duration of the content. Alternatively, the network may be fast, in which case multiple media streams might be transferred in much less time than taken for playback of one content item. The viewer on the destination DVR may start viewing the media stream as soon as the first portions are available, in parallel with the ongoing download of the stream.

There is no requirement that the source or destination DVR be a complete digital video DVR. For instance, the media streams stored on a server in a cable head end may be transferred reliably to the destination DVR 770. Alternatively, the media stream stored in the source DVR 110 may be transferred to a head-end server.

For example, a PC can use a USB dongle containing the crypto chip from the DVR. The PC establishes a secure mechanism for transferring content to and from the PC. The PC would appear to be a DVR to other DVRs, because it would use the USB dongle to authenticate and generate encryption keys. Content can then be stored on the PC in encrypted form. The content can be emailed to other PCs or DVRs. The other PCs must have a USB dongle to decrypt the content. Certificates that are passed from the service center 130 to the PC are stored in NVRAM on the USB dongle so the certificate moves with the dongle and is not stored on the PC's hard drive.

Certain media distribution architectures, such as digital satellite systems, broadcast most media content in an encrypted state. Using a local decryption facility based on a smart-card, the media content is decrypted only if it is viewed, thus protecting the content from theft. It is possible for the DVR to save these encrypted media streams to disk, and to initiate decryption upon playback. This method may be used to transfer media streams between two DVRs. In order to properly comply a particular set of content protection rules associated with the media stream (such as play once, expire after one day, etc.), the DVR maintains with the database object describing the media stream the copy protection information associated with the media stream (including whether the stream is stored encrypted).

The content protection rules associated with the media stream may be transferred to the destination DVR 770 as well. For example, the DVR 110 may have stored a movie from the content server 720 that will not be decrypted until it is viewed. If the viewer wishes to have this media stream transferred, it is copied into the media region of the destination DVR 770, and the descriptive object is transferred as well. In this approach, the original information in the media stream is faithfully duplicated to the destination DVR 770.

The smart-card might be pulled from the source DVR 110 and installed in the destination DVR 770. When the media content is viewed, the viewer is properly charged and all copy protection rules followed. The original media content and descriptive information might, or might not, be removed. For instance, in a "view-once" scheme, the originals are destroyed, whereas in a "charge-per-view" scheme, they are not.

Using the same techniques as described above, a secure, or authenticated and secure, connection may be established between two or more DVRs using a network or modem connection. Establishing such a connection enables control interactions to take place. Some examples of control interactions that may be provided in various embodiments are:

(1) Synchronized playback. A viewer may control trick-play features on a particular media stream. Each key event is also passed to the destination DVR 770, which automatically performs the same action. For example, a presenter may give a live presentation using the source DVR 110 as a multimedia playback device, and an audience at a remote location can watch the same presentation given in the same way at the same time. Alternatively, two viewers communicating through some other means, such as a telephone, may interact, while one or the other controls the playback on both DVRs of the same program. This alternative approach allows precise discussion of the program of interest. The means of communication may be a simple chat program overlaid on the display in which the participants type comments. Such an approach may be used for business presentations as well as for entertainment purposes.

(2) Link passing. A viewer of the source DVR 110 may indicate that a particular program shall be linked to the destination DVR 770. In response, the source DVR 110 sends a message to the destination DVR 770 which causes the destination DVR to schedule recording of the linked program. Alternately, the program may be unlinked as well. A message for linking or unlinking may contain only the program identification, assuming both DVRs 110 and 770 are in service. If the destination DVR 770 is not in service, then the message for linking may contain additional metadata.

(3) Sound or graphics effects. When the viewer takes an action, such as pressing a particular key sequence, the source DVR 110 may play a sound or present a graphic. The source DVR 110 also may pass that event to the destination DVR 770 which reproduces that same sound or graphic, or a different sound or graphic associated at the destination DVR 770 with the action that was taken. For instance, a child may add sounds to a program this way, which may be replicated for his friend on a remote destination DVR 770. Such communication may be multi-way.

In another approach, DVRs may transfer other types of data as well. For example, consider a large home DVR 110 and a smaller portable DVR 760. Data such as software, graphical elements, program guide data, etc., may be transferred between the two DVRs. For instance, the portable DVR 760 may be updated or data synched by the home DVR 110 every time the two DVRs are connected. The update may include transferring and installing a software update, synchronizing program information, synchronizing recording schedules, etc. The synch is much like a PDA where the portable DVR 760 may tell the home DVR 110 to delete a program because the user has already viewed it. The portable DVR 760 transfers any operational information to the home DVR 110 whenever two DVRs are connected, and the home DVR 110 then sends the operational information to the service center 130 whenever the home DVR 110 accesses to the service center 130.

The update may be done automatically. In such a case, when two DVRs are connected, a set of pre-configured actions are performed, such as updating program guide or software, and then media streams may be transferred as well. If the destination DVR 760 is a smaller portable unit, then not all media streams would fit. In this case, the viewer may explicitly choose which media streams to transfer. Alternatively, application software in the source DVR may use preference information to select a subset of the available media of most interest to the viewer and transfer only those streams. In another alternative, media streams are transferred going from newest to oldest, stopping when no more will fit, or oldest to newest. A season pass (where all showings of a program on a channel are recorded) may include a marker that DVR to "always transfer" or "never transfer". Other criteria may be whether the program was explicitly picked or chosen based on viewer preferences. Any program information stored in the descriptive object for the content may be used in the selection criteria, such as length, actors, rating, etc. The criteria can trigger actions such as "always transfer".

G. Network Security Schema

As mentioned above, one approach herein provides a secure encrypted data transfer between DVRs 110, 760, 770 or a content server 720 and a DVR 110, 760, 770. The approach allows users to record a program on one DVR 110, and then watch the program on another DVR 770.

The encrypted data transfer system described herein makes it very difficult to transfer videos from a DVR to any incompatible system, or to a system outside the location of the first DVR. Accordingly, users may exercise reasonable Fair Use rights to the recordings that they have made, but the approach makes it difficult for users to 'pirate' videos, or send premium content to their friends in violation of Fair Use principles.

Various embodiments of the approaches herein may include the following aspects:

- Recordings are encrypted. Many recordings are encrypted when they are initially recorded. Those recordings that are not encrypted may be encrypted before being transferred from one DVR to another. This makes it difficult for anyone to "sniff" the recording data as it travels through a home's network and to make a copy of the data.
- When an encrypted recording is transferred from one DVR to another, the receiving system cannot use the recording unless the sending system also transfers the encryption/decryption key associated with that one recording.
- A DVR may discover other systems from which it might transfer recordings via an IP broadcast mechanism or other network discovery protocol. In such discovery protocols, discovery packets typically do not leave the local IP subnet. In the residential environment, a local IP subnet comprises a home's LAN. Additionally or alternatively, if there is a concern that a user will try to share recordings with other users, then application software of the DVR provides no mechanism which would allow the system's owner to type in or otherwise manually specify the IP address of a system located elsewhere on the Internet.
- A DVR may only send a recording encryption key to another DVR, if the receiving system is "authorized" to view that recording. For example, in this context "authorized" may mean that the destination DVR is in the same household or is registered by the owner as authorized. The key transfer is performed using a robust public/private key system—in which each key transferred is intelligible only to the one system to which it was sent.
- The authorization is done via a digital certificate, which lists the specific systems known to be part of one household or owned by a single user. The certificate includes the public keys of the systems, and is "signed" by the service provider. Each system verifies the signature on the certificate it is using, and also verifies its own identity against that contained in the certificate, before transferring any data or keys to any other system.

The certificate system can be based on the ElGamal public/private key system and on the Blowfish symmetric block cipher, which includes self-checking that would block attacks such as "change a system's serial number" or "copy a certificate to a different system" or "alter a certificate".

Referring to FIGS. 7 and 9, a user logs onto the service center 130 to create a record of the DVRs that he wants to share content between. Using any appropriate user interface, the user enters the serial numbers of the DVRs that he wants included, which the service center 130 verifies through its database, or the service center 130 finds the serial numbers that the user has previously registered. The service center 130 can also restrict the user to only the DVRs that he is a registered owner of by displaying only those DVRs for selection. The user can associate a name with each unit, e.g., living room DVR, bedroom, etc., to allow the user to easily identify a unit. The user selects the units that he wants to share or transfer media with.

The service center 130 creates a digital certificate 901 that identifies the user's units that he has selected. The certificate 901 includes each unit's serial number 903, 905, and the corresponding public key 904, 905. The name that the user has assigned to each unit is also cross referenced, as indicated by name 902 in the certificate 901. The certificate can contain any number of units that the user identifies, including PCs with USB dongles as described above.

To ensure that the certificate 901 does not exist indefinitely, an expiration date 907 is included in the certificate 901. A digital signature 908 is used so that units that receive the certificate can verify that the certificate actually originated from the service center 130.

The service center 130 sends the certificate to each DVR 110, 770, listed in the certificate 901 over the network 140 (which may comprise the internet, a LAN, or other public or private network), phone line, or satellite connection. The certificate 901 may be encrypted using the public key of each destination DVR 110, 760, 770. A portable DVR 760 can connect to the service center 130 via a network connection or phone line to receive its certificate. Alternatively, the portable DVR 760 can receive its certificate from a DVR 110 that it connects to.

Each DVR 110, 760, 770, verifies the certificate by decrypting the certificate and verifying the digital signature 908 in the certificate 901. Once the DVR has verified that the digital signature 908 is from the service center 130, the DVR finds the network locations of all peers that are listed in the certificate 901, using a peer discovery protocol, such as Rendezvous from Apple Computer Inc. of Cupertino, Calif.

Once a DVR 110 has discovered a peer 770 in the network, it sets up an encrypted connection with the peer 770 using the peer's public key from the certificate 901. The encrypted connection may be "weakly" encrypted in that it is a function of two public keys, one from each peer. Each peer sends a message using the other's public key. A unit is designated as the content server, in this example, the content server 720 is provided by the service provider and is remotely located.

The content server 720 creates a more strongly encrypted connection with the DVR 110 by creating a random strong connection key and encrypts the strong key using the DVR's public key. The content server 720 then sends the encrypted strong key to the DVR 110. The DVR 110 decrypts the strong key. In one approach, decryption may use hardware decryption elements. The two systems now share a secure key.

The user can request sending certain recorded content to the DVR 110. When the content server 720 sends a previously encrypted recording to the DVR 110, it loads a recording key that was used to encrypt the recording from its database and encrypts the recording key using the strong key. The content server 720 sends the encrypted recording key to the DVR 110.

The DVR 110 decrypts the recording key using the strong key that it shares with the content server 720 and stores the recording key. The content server 720 sends the recorded content that it has stored locally to the DVR 110. The recorded content has already been encrypted when it was originally stored locally by the content server 720. The content server 720 sends the recorded content without decrypting the content.

The DVR 110 writes the recorded content directly to its storage device without decoding it. When the DVR plays the recorded content, it decodes the content on the fly. The approach described herein preserves the integrity of the recorded content because the content is in an encrypted state during transmission and is stored encrypted on the DVR, thereby preventing any unauthorized copying of the content.

If the content server 720 sends an unencrypted recording to the DVR 110, it creates a random recording key that will be used to encrypt the recording and encrypts the recording key using the strong key. The content server 720 sends the encrypted recording key to the DVR 110.

The DVR 110 decrypts the recording key using the strong key that it shares with the content server 720 and stores the recording key. The content server 720 sends the recorded content that it has stored locally to the DVR 110. The recorded content was not encrypted when it was originally stored locally by the content server 720. The content server 720 sends the recorded content, encrypting the content as it sends the content.

The DVR 110 writes the recorded content directly to its storage device without decoding it. When the DVR plays the recorded content, it decodes the content on the fly. The approach still preserves the integrity of the recorded content because the content is in an encrypted state during transmission and is stored encrypted on the DVR, thereby preventing any unauthorized copying of the content.

Figure 10:
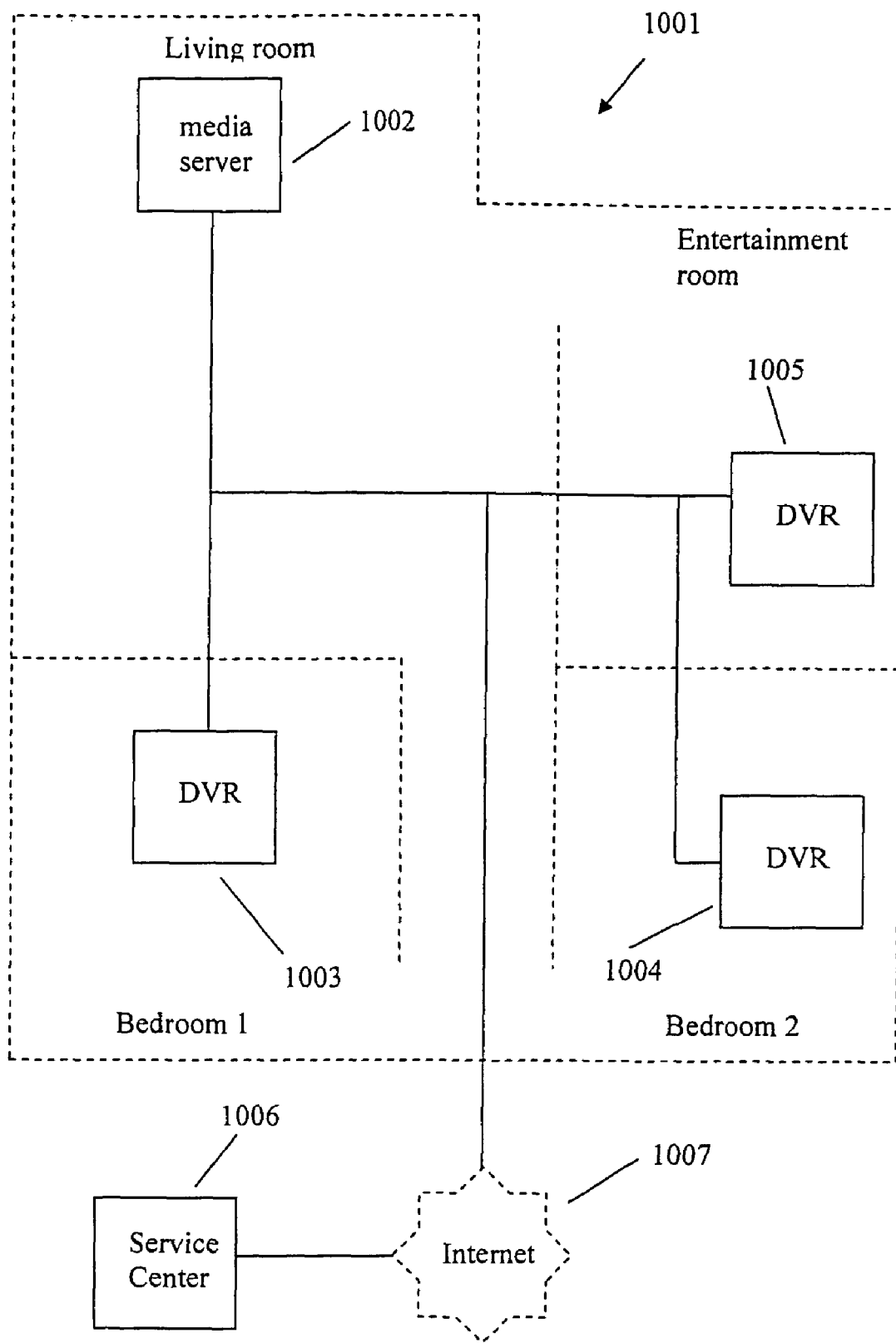
FIG. 10 is a block diagram illustrating a media server in a local network connected to DVRs within a home.

FIG. 10 shows a media server 1002 in a locally networked DVR setup in a house 1001. In the example of FIG. 10, DVR 1003 is located in Bedroom 1, DVR 1004 is located in Bedroom 2, and DVR 1005 is located in the Entertainment room. The media server 1002 resides in the Living room. The user sends information instructing the service center 1006 that DVRs 1003, 1004, 1005, and media server 1002 are authorized to share content and associates each unit by the room in which it resides. The service center 1006 creates a certificate 901 that contains the media server's 1002 and each DVR's 1003, 1004, 1005, serial number and public key along with an expiration date and the service center's digital signature.

The media server 1002 can be a PC, DVR, or other type of content server. The user designates the media server 1002 as the main source of multimedia content in the local network.

The service center 1006 sends the certificate to the media server 1002 and the DVRs 1003, 1004, 1005, via the Internet 1007. The media server 1002 and the DVRs 1003, 1004, 1005, use the information in the certificate to discover their peers. The DVRs 1103, 1004, 1005, discover that the media server 1002 is the only system that is serving content. Once the media server 1002 has established a weakly encrypted connection with each DVR 1003, 1004, 1005, it creates a random strong connection key for each DVR 1003, 1004, 1005. The media server 1002 encrypts each strong key using the particular DVR's public key and sends the encrypted strong key to each DVR 1003, 1004, 1005. The DVR uses its local crypto chip to decrypt the strong key. The media server 1002 now shares a secure key with each DVR 1003, 1004, 1005.

Figure 16:
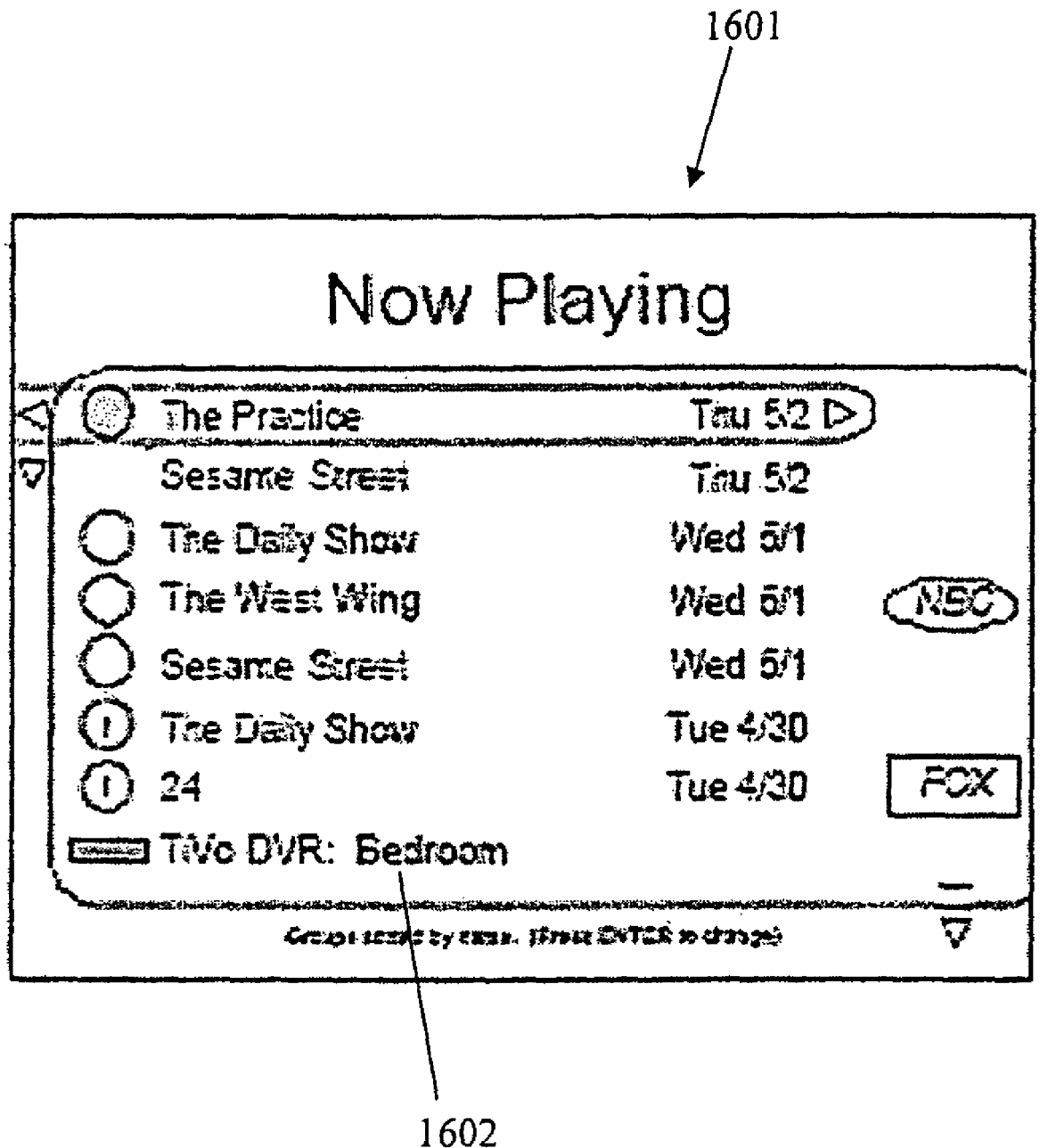
FIG. 16 is a screen capture of a Now Playing screen showing an accessible media server.
Figure 17:
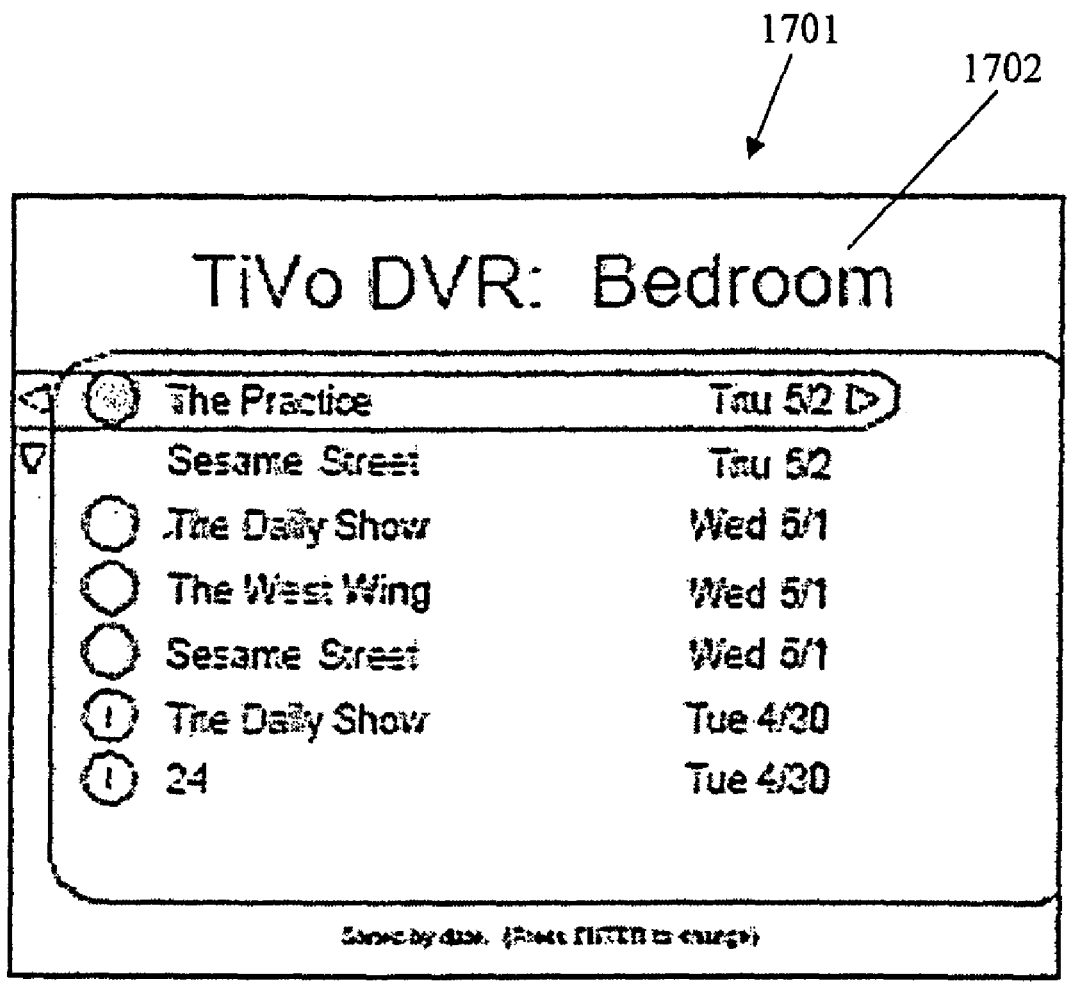
FIG. 17 is a screen capture of a content screen showing accessible content for a media server.
Figure 18:
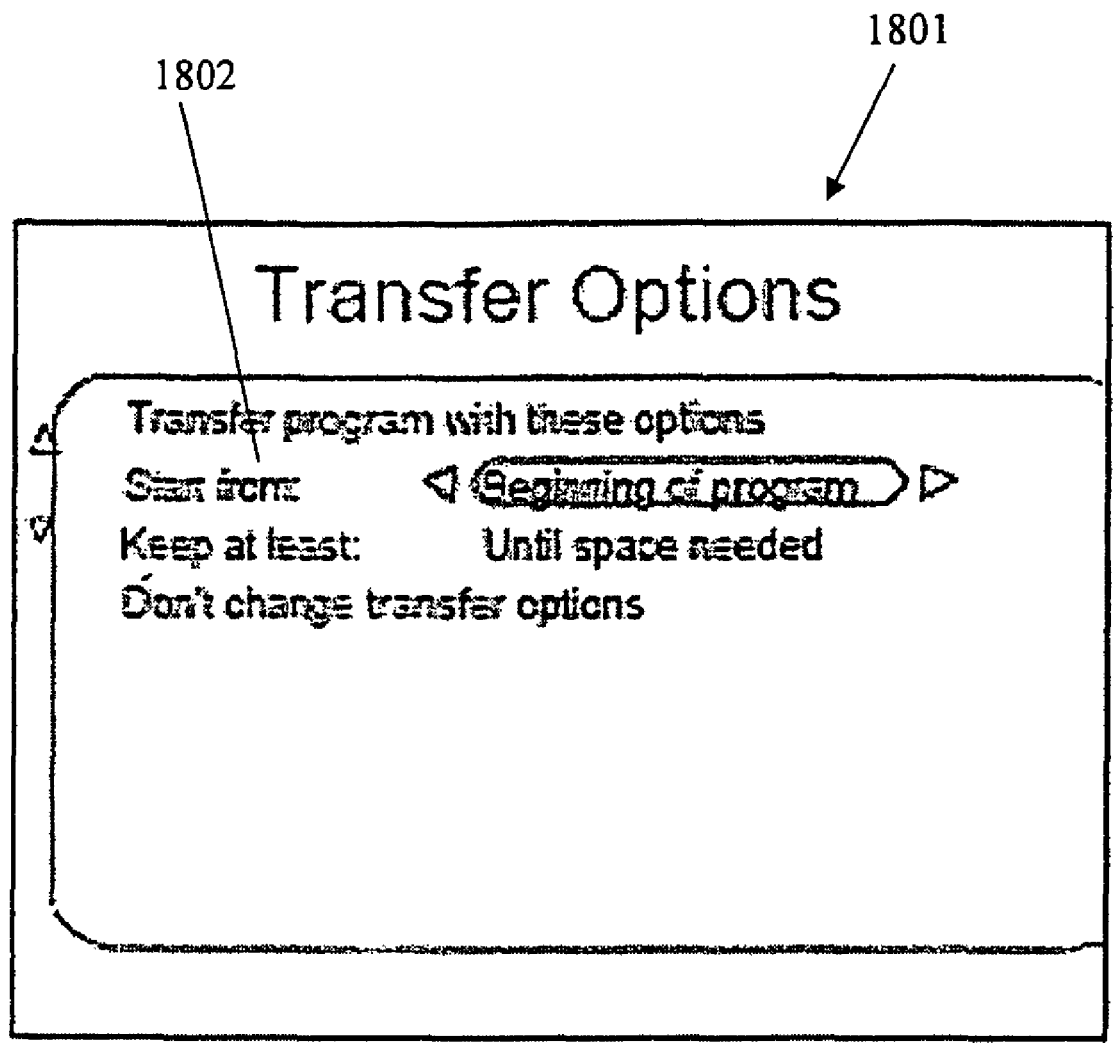
FIG. 18 is a screen capture of a transfer options screen showing for content from a media server.

Referring to FIGS. 16-21, each DVR has access to the media server's contents. Referring first to FIG. 16, the user goes to the Now Playing screen 1601 (which is the similar in format and content to the Now Showing screen in FIG. 6) and sees all media servers that the user can access. For example, a media server label 1602 indicates that the user can access the DVR named "Bedroom." The user selects the desired server using label 1602 and a content screen 1701 (FIG. 17) is displayed that lists what content the media server has available. The user can request that certain recorded content (music, photos, video, etc.) be sent to a particular DVR 1003 via the content screen 1701. The user can do this remotely as described above, or through the DVR 1003 itself. The user selects the options for transferring the selected content using a transfer options screen 1801 (FIG. 18). The user can select where to start the transfer from using a Start From option 1802. For example, the transfer can start from the beginning of the program, from where the user last paused, or at a certain time into the program. The user can view and transfer music content and photo content in the same manner, as indicated by screen capture 2001 of FIG. 20 and screen capture 2101 of FIG. 21.

As described above with reference to FIG. 10, the media server 1002 can send a previously encrypted recording to the DVR 1003. The media server 1002 loads a recording key that was used to encrypt the recording from its database and encrypts the recording key using the strong key. The media server 1002 can optionally encrypt the recording key for storage in its database using a local encryption key. It is normally not desirable to store any of the encryption keys in cleartext, so simple encryption with a local key is best. It sends the encrypted recording key to the DVR 1003.

The DVR 1003 decrypts the recording key using the strong key that it shares with the media server 1002 and stores the recording key. The DVR 1003 can optionally encrypt the recording key using a local key before storage. The media server 1002 sends the recorded content that it has stored locally to the DVR 1003. The recorded content has already been encrypted when it was originally stored locally by the media server 1002. The media server 1002 sends the recorded content without decrypting the content.

Figure 19:
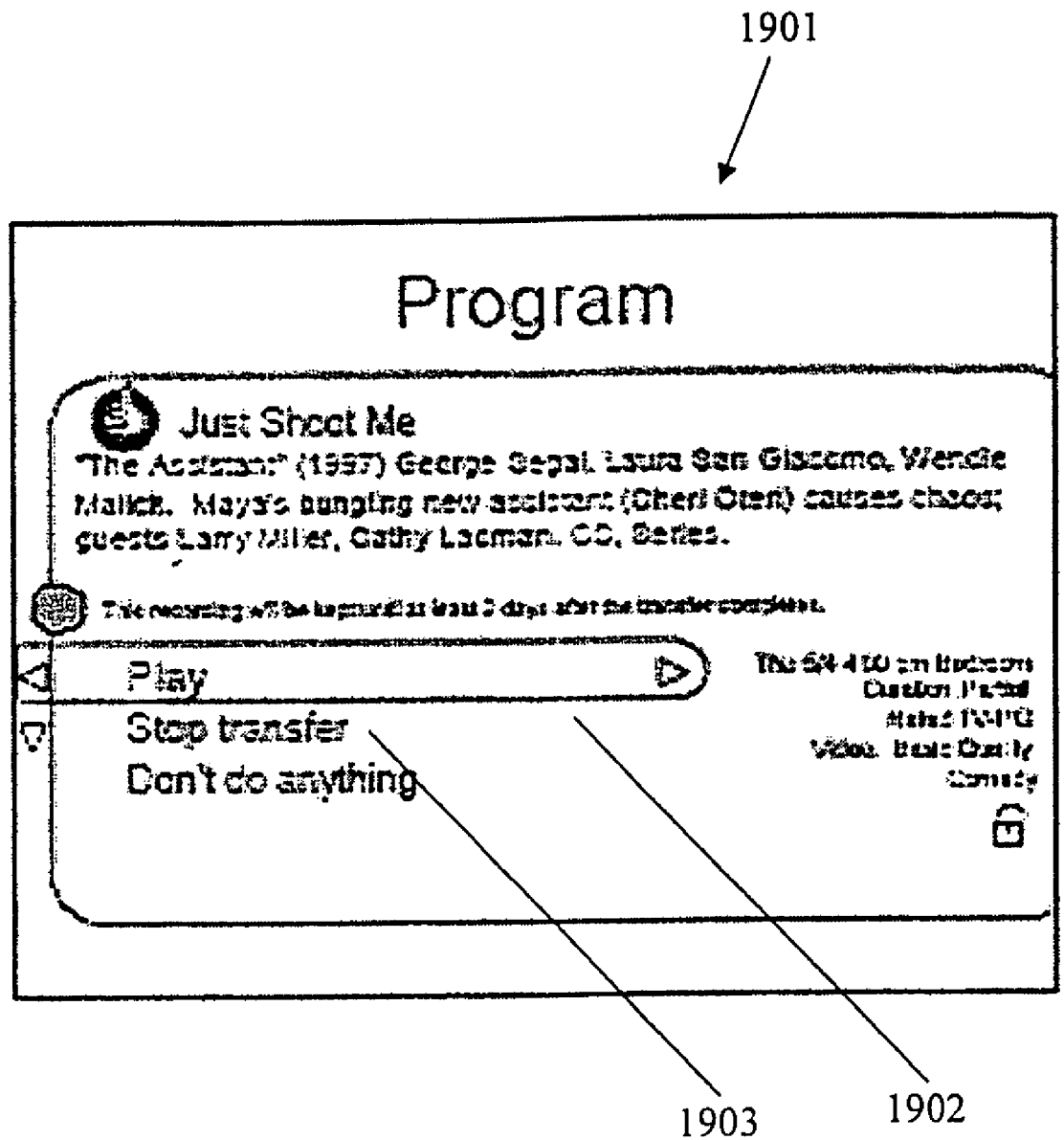
FIG. 19 is a screen capture of a program status screen showing a program being transferred from media server.

The DVR 1003 writes the recorded content directly to its storage device without decoding it. When the DVR 1003 plays the recorded content, it decodes the content on the fly using the recording key. Referring to FIG. 19, the user can select the program information screen 1901 to see if the program is still transferring. The user can play the program by selecting Play option 1902 while the transfer is in progress (as described above) or stop the transfer using Stop transfer option 1903.

If the media server 1002 sends an unencrypted recording to the DVR 1003, it creates a random recording key that will be used to encrypt the recording and encrypts the recording key using the strong key. The media server 1002 sends the encrypted recording key to the DVR 1003.

The DVR 1003 decrypts the recording key using the strong key that it shares with the media server 1002 and stores the recording key. The DVR 1003 can optionally encrypt the recording key using a local key before storage. The media server 1002 sends the recorded content that it has stored locally to the DVR 1003. The recorded content was not encrypted when it was originally stored locally by the media server 1002. The media server 1002 sends the recorded content, encrypting the content as it sends the content.

The DVR 1003 writes the recorded content directly to its storage device without decoding it. When the DVR 1003 plays the recorded content, it decodes the content on the fly using the recording key.

Note that if content copyrights are a concern, the DVR 1003 does not need to store the content on its storage device. It simply plays or displays the content immediately. If the content is encrypted, the DVR 1003 decrypts the content on the fly.

The approach described above performs equally well in a local network as it does across the Internet.

H. Preserving Certificate Coherency

Figure 11:
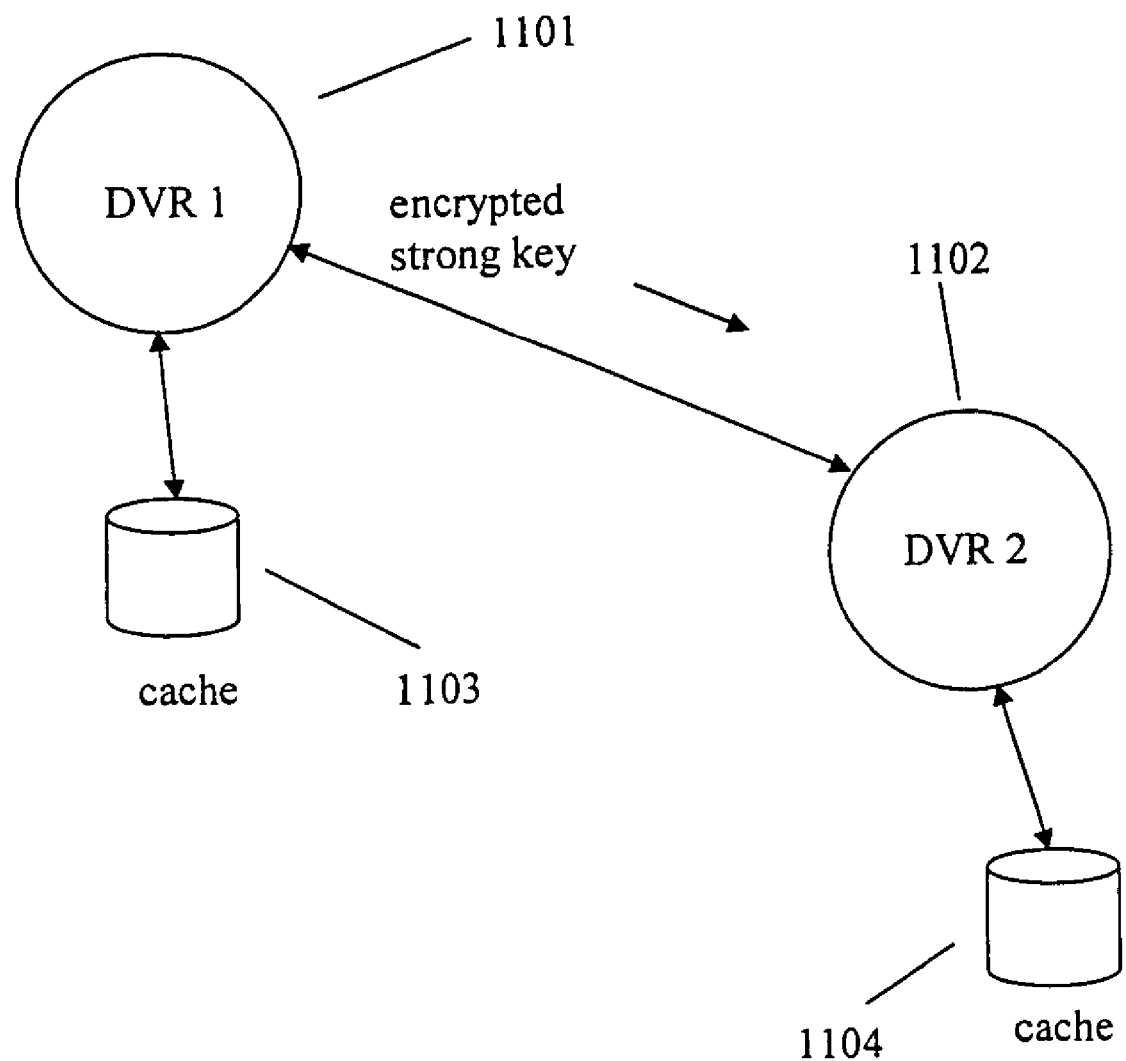
FIG. 11 is a block diagram illustrating a communication exchange between two DVRs to create a strong encrypted connection.

Referring again to FIG. 11, the creation of a strong key takes many CPU cycles. In one approach, DVR 1101 may be required to create and store a plurality of strong keys for future use at the time that it is designated as the media server.

Further, the receiving DVR requires many CPU cycles to decrypt the strong key upon receipt. This significantly slows down the DVR's overall performance. The techniques herein save the DVR 1101 the added burden of creating a new strong key whenever a DVR 1102 reboots or is restarted. It also saves DVR 1102 the burden of decrypting the strong key after reboot or restart.

The DVR 1101 originally creates a strong connection key, stores it in its local cache 1103, and encrypts the key using the public key of the other DVR 1102. The DVR 1101 sends the encrypted strong key to the DVR 1102. The DVR 1102 decrypts the strong key and stores the key in its local cache 1104 along with the encrypted strong key and the machine serial number of DVR 1101.

If the DVR 1102 reboots or is restarted, it does not know what its status is in the network. It may have been down for a few seconds or it may have been transplanted from another network. The DVR 1102 requests the strong key from the DVR 1101 designated as the media server. The DVR 1101 sends the strong key that it has stored in its local cache 1103, or if the DVR 1102 has not had a strong connection established with the DVR 1101, creates a new strong key. The strong key is encrypted using the public key of the DVR 1102 and is sent to the DVR 1102.

When the DVR 1102 receives the encrypted strong key, it checks the local cache 1104 for an entry from the DVR 1101 and, if it finds one, it does a bitwise comparison with the encrypted key in the local cache 1104. If the two keys are the same, then the DVR 1102 uses the previously decrypted key stored in the local cache 1104. Otherwise the DVR 1102 decrypts the newly sent key and stores the encrypted key, decrypted key, and DVR 1101 machine serial number in a new entry in the local cache 1104. This way the long decryption step is avoided except when absolutely necessary.

I. Internet Media Downloading

Figure 12:
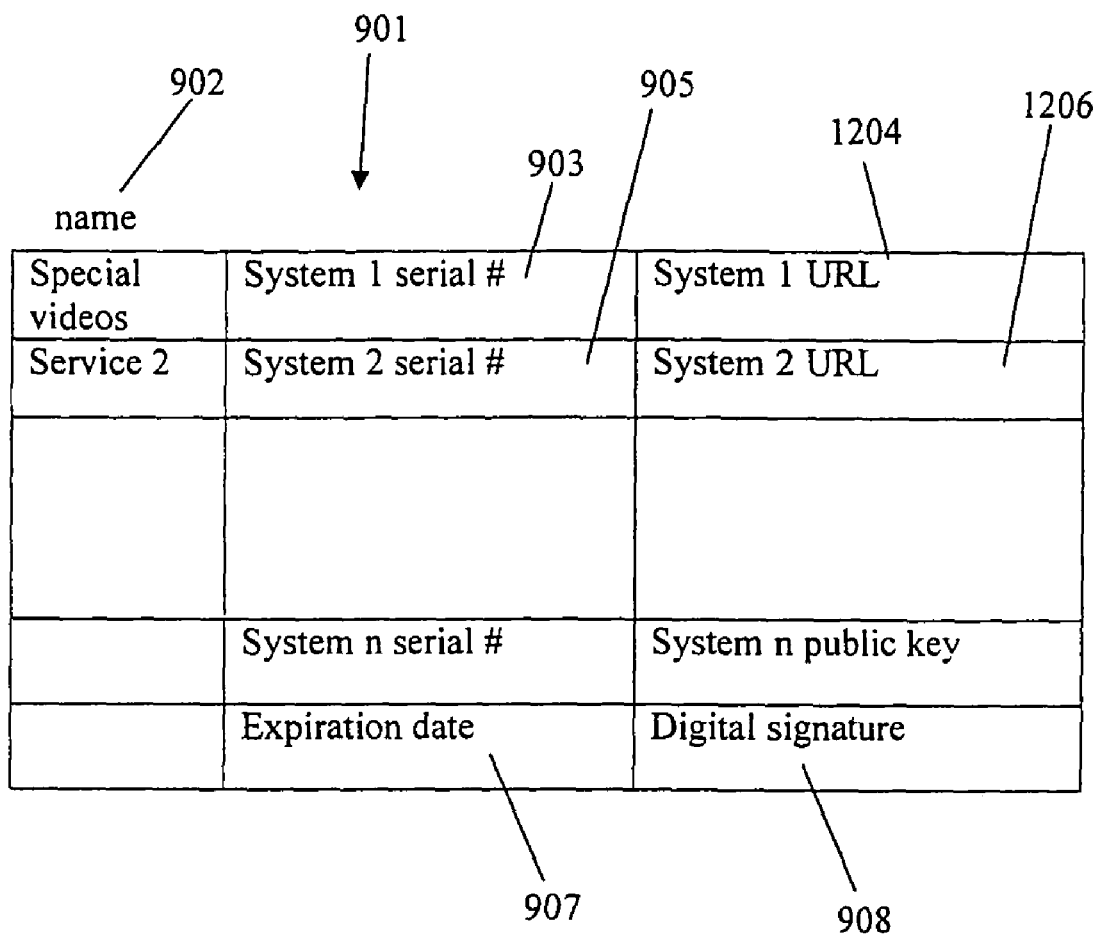
FIG. 12 is a diagram illustrating a digital certificate containing DVR and content server information.

To facilitate Internet media downloading from a server to a DVR, FIG. 12 shows a modification of the digital certificate shown in FIG. 9. Also, referring again to FIG. 7, the service center 130 creates the certificate 901 which is distributed to DVRs 110, 770. The DVR 110, 770 will recognize a service entry using a specially-prefixed serial number in the service's serial number field 903, for example: FFFxxxxxxxxxxxx, where the "xxxxxxxxxxxx" is used to provide additional information, such as version numbers, service provider, etc. The display name 902 is set to something indicative of the service, such as "Special Videos". Instead of a direct public key, the key field 1204, 1206 is filled in with a fully qualified domain name of the access point for the server.

The certificate 901 can contain a mix of service server information and peer unit information. The expiration date 907 and digital signature 908 remain the same.

Thus, the service center 130 can place information in the fields in all, or a group, of certificates to name the same or different servers, etc.

A DVR 110 recognizes the service serial number in the certificate and sends a ping to the server using the domain name in the key field, for example, the key field 1204, to see if it is reachable. When a new DVR connects, the server looks up the DVR's public key and uses that to generate any other needed keys. The DVR does not need to possess a key for the server; the server generates the strong key for the session and encrypts the strong key with the DVR's public key. It then passes the encrypted strong key to the DVR.

Once communication is established the DVR 110 can then query the server for content.

The server synthesizes the appropriate metadata to describe what it has available and sends it to the DVR 110. Since the metadata is synthesized, it can be uniquely created on a per-DVR basis. For example, a DVR owner may sign up for different kinds of services, such as history, drama, comedy, etc.

Alternatively, the server can instruct the DVR 110 to send its preference vector to the server, which the server uses to synthesize the appropriate metadata. The DVR's preference vector contains the user's viewing habits, e.g., what the user has indicated that he does and does not like, what he has consistently recorded using options such as a season pass subscription. The server does not store the preference vector information; it simply discards the information after use. This preserves the user's privacy and makes sure the preferences are always kept on the DVR 110.

Figure 20:
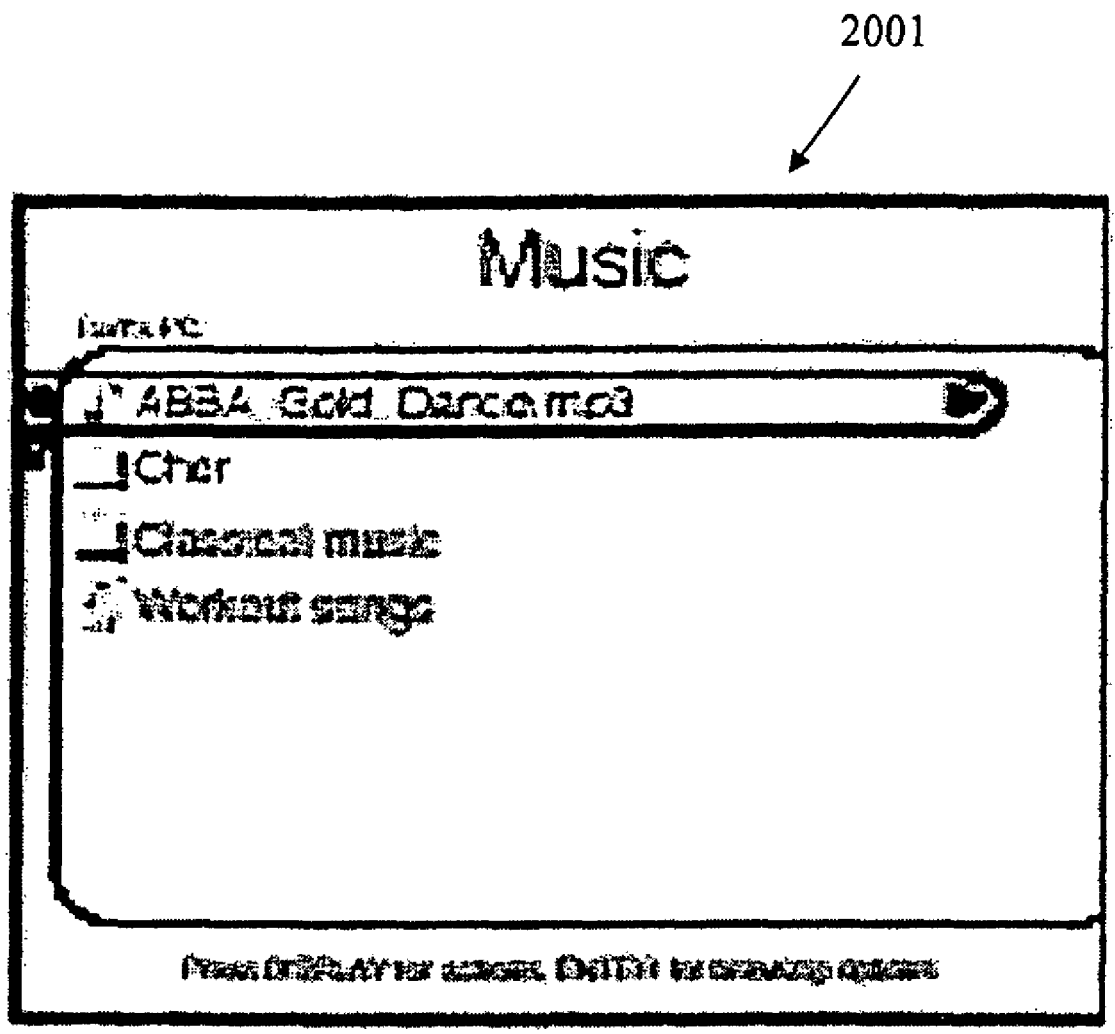
FIG. 20 is a screen capture of a music screen showing accessible music from a media server.
Figure 21:
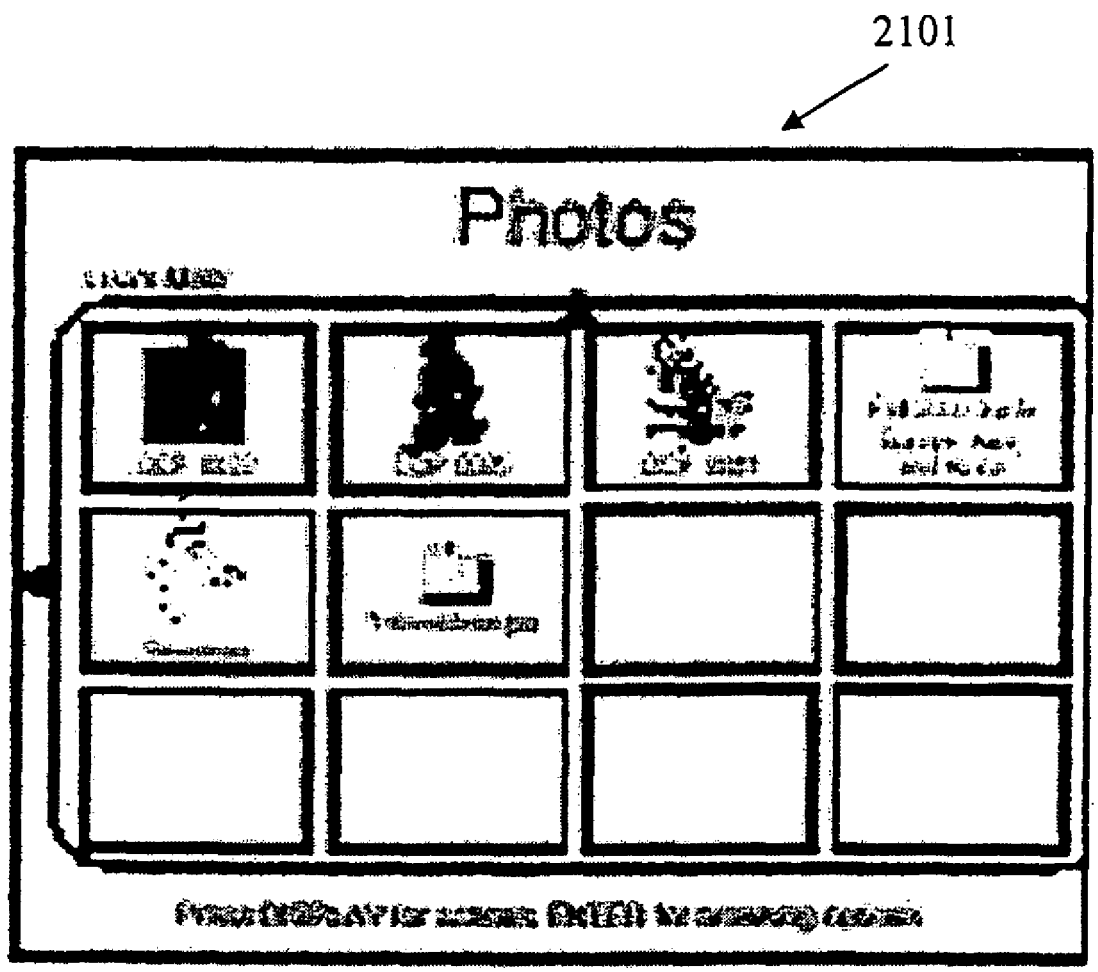
FIG. 21 is a screen capture of a photo screen showing accessible photos from a media server.

The standard video, music, and photo transfer interface is used as described above. FIG. 16 shows a Now Playing screen 1601 where available content from the DVR itself and other accessible servers and DVRs are displayed 1602. An entry for content from a service has its associated name from the certificate listed. In the same manner, content from another DVR is listed using the name 1602 that the user has associated with it, if any exists. This way, the user knows the source of the content. FIG. 17 shows the content screen 1701 displaying the name of the content source 1702. FIGS. 20 and 21 show a music content screen 2001 and photo content screen 2101.

Figure 13:
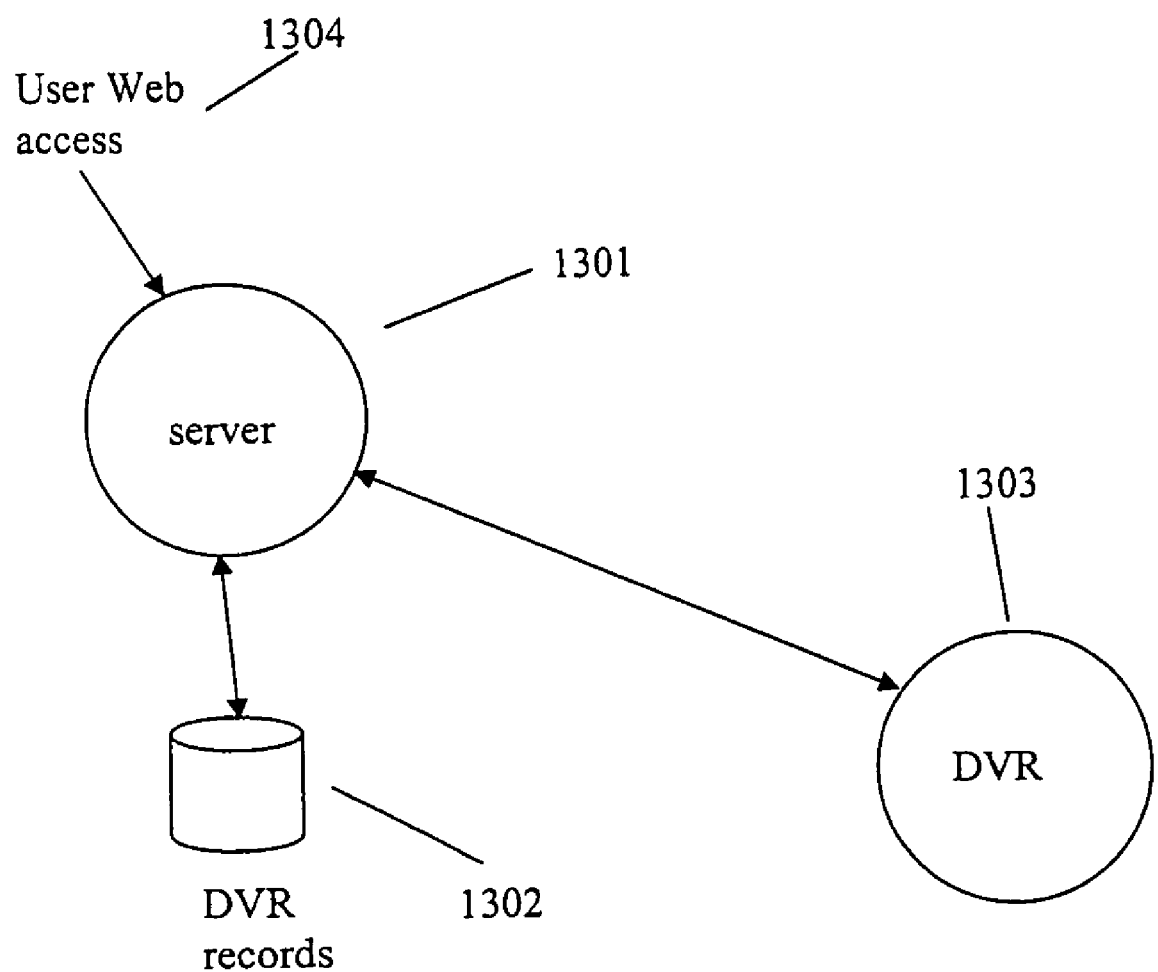
FIG. 13 is a block diagram illustrating a server recording DVR access information for billing purposes.

Referring to FIG. 13, DVRs that are interested in downloading content from a server 1301, ping the server 1301. The server 1301 runs the ping service, responding to requests from DVRs as they come in. This allows the server 1301 to maintain a record 1302 of all DVRs that are "signed up" to download video. The record 1302 can later be audited to ensure, for example, that there are no clones of DVRs accessing the downloadable video from another IP address. The record 1302 can also be used for billing purposes to track the length of time a user has his DVR 1303 signed up to download video.

When the user selects an entry from a server 1301 to transfer to a DVR 1303, the DVR 1303 contacts the server 1301 and requests the appropriate media object. At that point, the server 1301 can record 1302 that the program is being downloaded, which may also include an entry into a billing system, etc.

The records can be queried on the service center's Web site by a user 1304 so he can easily check his bill.

Figure 14:
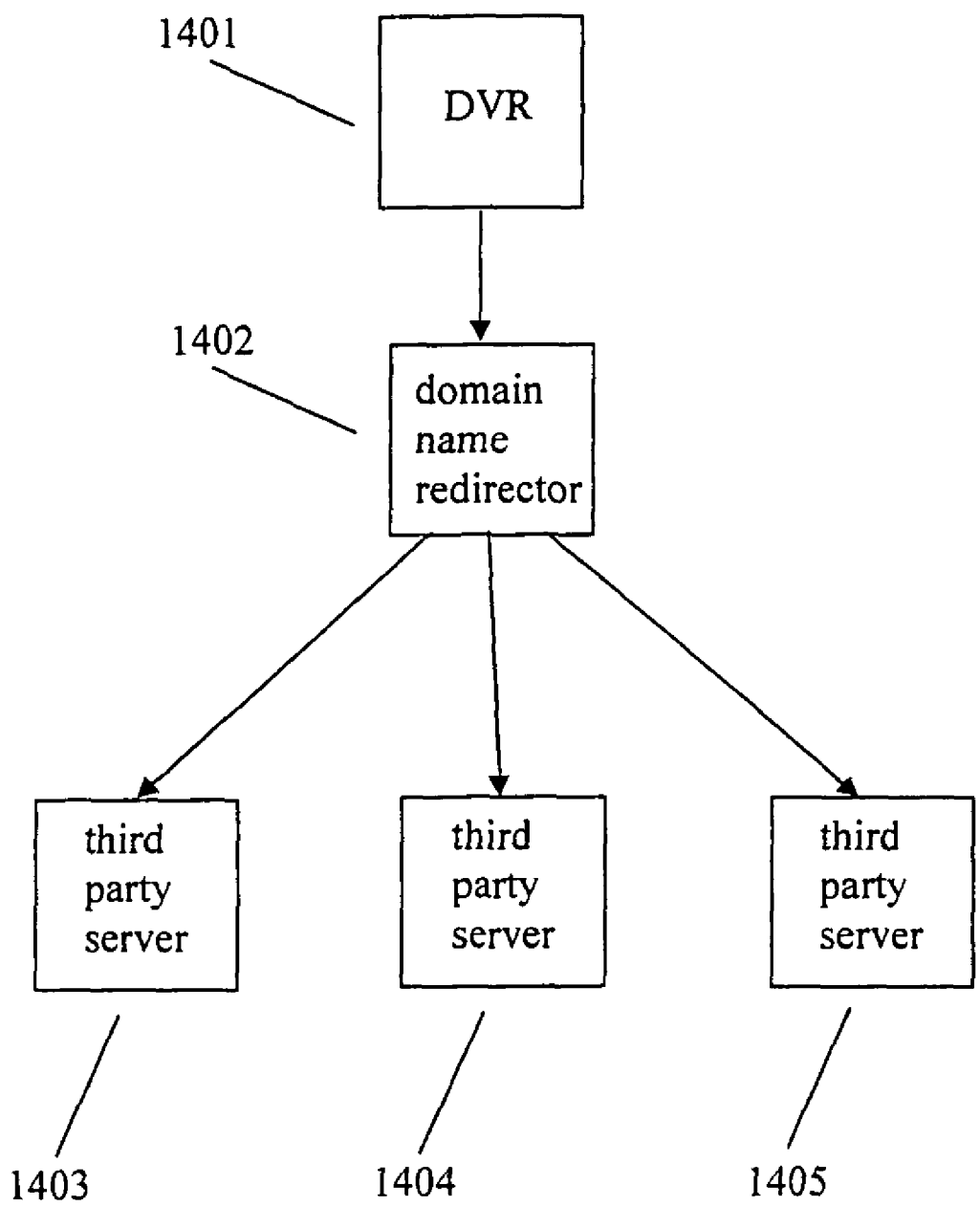
FIG. 14 is a block diagram illustrating a domain name redirector that redirects a DVR request to a third party server.

Referring to FIG. 14, a domain-name redirector 1402 can be used that redirects a connection from a DVR 1401 to one of a group of third party servers 1403, 1404, 1405. Redirection may occur based on load, the domain-name prefix used, etc. This allows the service center to redirect a request to another company's server. Redirection may involve a fee or revenue share in various embodiments.

A domain name redirector 1402 can reside on each third party server 1403, 1404, 1405, so a request from a DVR 1401 can be redirected by the third party server itself. The DVR 1401 requests a connection with third party server 1403. Third party server 1403 "delegates" its responsibilities to third party server 1404 by redirecting the request from the DVR 1401 to third party server 1404. DVR 1401 then contacts third party server 1404 for its content requests. This allows a third party server to judge by itself if is overloaded or cannot handle a request for any reason.

J. Using a DVR as an Encryption Pipeline

Figure 15:
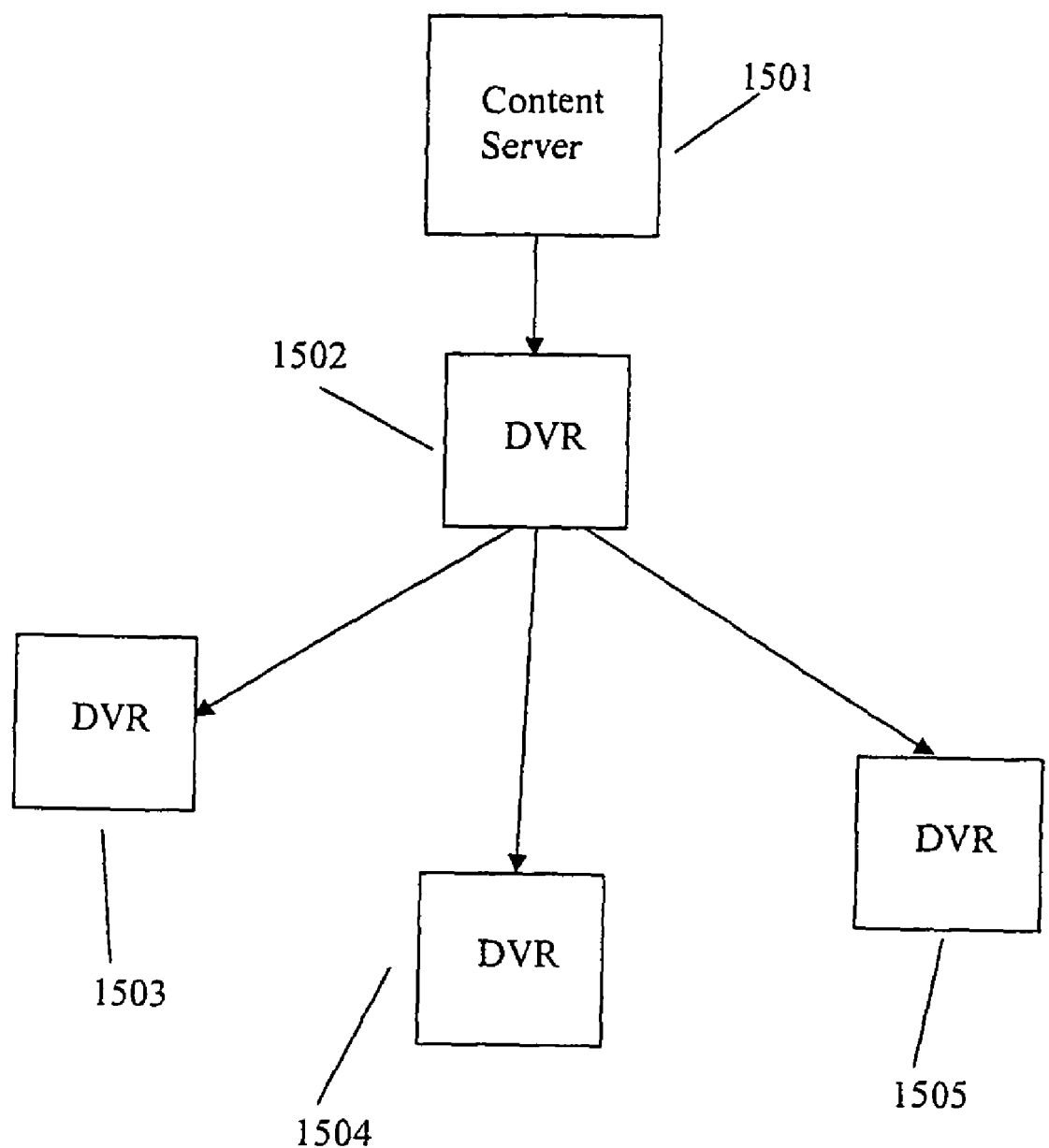
FIG. 15 is a block diagram illustrating a DVR being used as an encryption pipeline for a third party content server.

Referring to FIG. 15, content to be provided to a DVR 1503, 1504, 1505 can initially be produced by a content server 1501, such as a third party content server. The content server 1501 does not have access to any information about the DVR's encryption techniques or architecture. A DVR 1502 is used to encode and encrypt the content. The DVR 1502 has a fast network engine and functions as an "encryption pipeline". Data is sent from the content server 1501 to the DVR 1502. The DVR 1502 encodes (if needed) and encrypts the data while writing the data to its local storage device. The DVR 1502 then reads the data from the local storage device without decrypting, and sends the data over the network to a target DVR selected from among DVR 1503, 1504, 1505.

Another approach provides the third party content server with secure transmission of its content. Data is sent from the content server 1501 to the DVR 1502 using the content server's encryption technique. The DVR 1502 decrypts the data using the content server's decryption technique. The DVR 1502 then encodes (if needed) and encrypts (using the DVR's encryption technique) the data while writing the data to its local storage device. The DVR 1502 then reads the data from the local storage device without decrypting, and sends the data over the network to a target DVR selected from among DVR 1503, 1504, 1505.

This ensures that a third party content supplier does not have access to any sensitive information about the DVR crypto chip, encryption techniques, or addressing schemes. It further reduces the time to market and cost of incorporating third party suppliers into the content server network.

K. Accessing Content Via Email

As described above, the media server in any of the foregoing embodiments can be a PC, DVR, or any other mechanism that can serve content. The approaches described herein allow the DVRs, as clients of the media server, to access multimedia content such as music, video, and photo content stored on media servers. However, because the DVRs and media servers may have access to the Internet, the content need not originate nor be physically housed on any given media server.

Accordingly, content can be made available to DVR users by arranging for a server to process a special file containing:

Actual content (in the form of JPEG, MP3, or MPEG files, for example).

DVR configuration settings, for example, recording schedules, database modifications, content preferences, etc.

"Links" to another server or to the content stored on another server, located potentially anywhere on the Internet.

Such files can be provided to the DVR users via email or Internet download. Two example scenarios are described below that demonstrate how content can be sent via email to a DVR.

Figure 22:
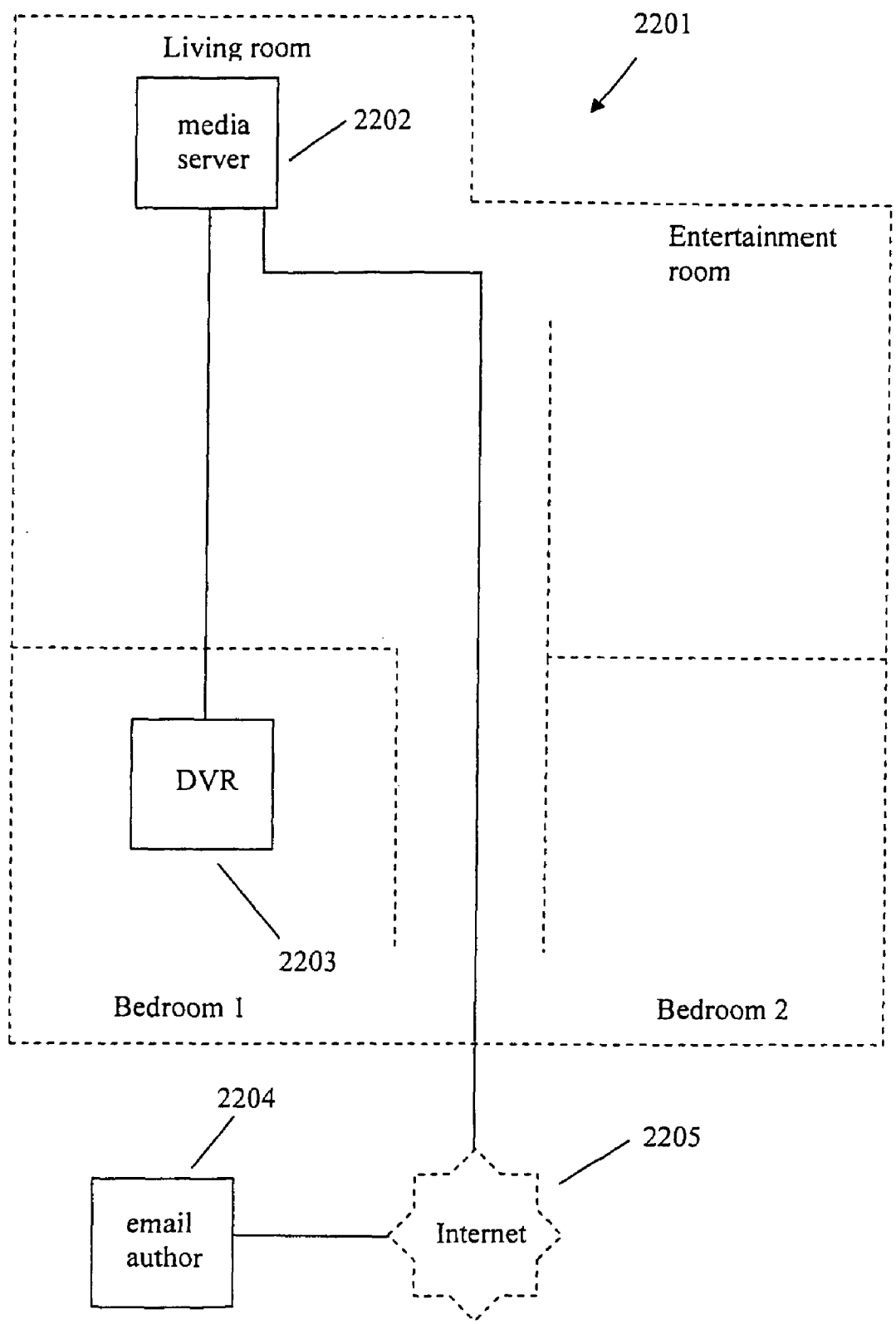
FIG. 22 is a block diagram illustrating a media server in a local network connected to a DVR within a home with the media server having Internet access.
Figure 23:
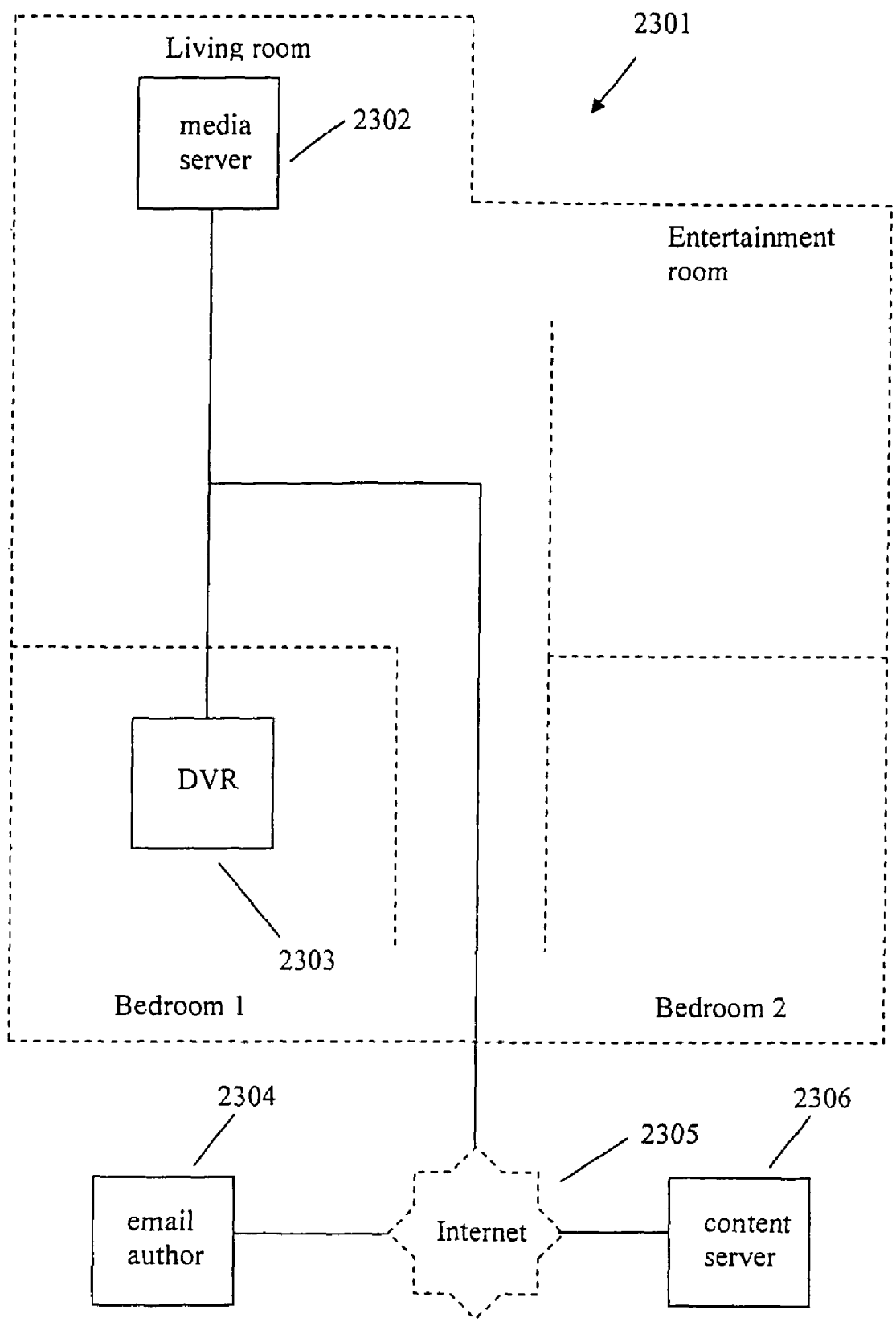
FIG. 23 is a block diagram illustrating a media server in a local network connected to a DVR within a home with both the media server and DVR having Internet access.

Referring to FIGS. 22 and 23, a typical household DVR setup 2201 is shown. Assume only the media server 2202 has access to the Internet 2205. An email author 2204 creates a content file with authoring software. The file, for example, contains the actual binary data for several images in JPEG format (it can contain any type of content). The content file is emailed as an attachment to a user who accesses email from the same computer running the media server 2202. Message communication mechanisms other than email may be used in alternative embodiments.

The user reads the email and, if he is interested in the content, the user selects the attached content file, invoking the media server 2202 to process the content file. The media server 2202 adds information about the images to an internal database from which container (metadata) information and JPEG data can be later generated.

The user goes to his DVR 2203 and accesses the "Music & Photos" feature via his television set, causing the DVR 2203 to request container information from the media server 2202. Among the other containers of available content shown in photo content screen 2101 (FIG. 21), the user can now access one with images from the content file. When the user issues the command to view one of the images, the DVR 2203 makes a request to the media server 2202, which consults its internal database to render the appropriate JPEG data and pass the data to the DVR 2203. The DVR 2203 displays the image to the user and does not store the image on its local storage device. The user can use trickplay functions on the multiple photo files such as fast forward, pause, reverse, play (slideshow), etc.

In FIG. 23, a household DVR setup 2301 is shown where both the DVR 2303 and media server 2302 have access to the Internet 2305. An author 2304 creates a content file with authoring software. The file links to one or more content files, such as MP3 music files, housed on the content server 2306 and served via HTTP. The content file is emailed as an attachment to a user who (ideally) accesses email from the same computer running the media server 2302.

The user reads the email and, if he is interested in the content, the user selects the attached content file, invoking the media server 2302 to process the content file. The media server 2302 adds information about the content files to an internal database from which container information can be later generated.

The customer goes to his DVR 2303 and accesses the "Music & Photos" feature, causing the DVR 2203 to request container information from the media server 2302. Among the other containers of available content shown in music content screen 2001 (FIG. 20), the customer can now access one with music served by the content server 2306. When the user issues the command to play one of the music files, the DVR 2303 accesses the content server 2306 directly over the Internet 2305 to retrieve the appropriate data. The user can use trickplay functions on the music files such as fast forward, pause, reverse, play, etc. The progress of through the music is displayed to the user through a connected television set using a replay bar as shown in FIG. 8. The DVR 2303 does not store the music on its storage device for copyright protection.

As noted above, the two preceding examples can be used for any type of content that a DVR can use or display. If configuration information is received, the DVR 2303 will store the configuration information on its local storage device and use the configuration information to configure itself. If video is received, the DVR 2303 can store the video content on its local storage device for later playback by the user. The user can use trickplay functions on the video content such as fast forward, pause, reverse, play, slow play, frame step, etc.

DVR users could use the approach to share content with each other via email. For example, one user could send to another user a content file with links to personal photos housed on the first customer's PC.

The approach herein can be further useful for third party vendors to market content to DVR users via email. For example, a record label could promote a new album by sending a content file with links to MP3 files containing sample songs.

Third party partners can use the approach herein to deliver product to DVR users via email. For example, a film processing lab could email a content file containing digitized photos purchased online by a DVR user.

L. Distributing Content Using IP Multicast

Having DVRs directly contact a content server for content has the benefit of allowing a DVR to obtain content on demand. One drawback is that the content server can be overloaded with content requests from a large number of DVRs. The content server is then the bottleneck in the system. One solution would be to add more content servers so the request load can be distributed among a larger set of content servers. However, that solution does not scale well as the number of DVRs grows large. The network of content servers becomes more difficult and costly to maintain as the network grows to keep up with the number of DVRs.

In actuality, there is a large amount of content that does not have to be obtained by the DVR in as immediate a fashion, for example, software updates, advertisements, fuzzy multimedia recordings, etc. DVRs can wait for such content to be pushed out from content servers to the DVRs. A DVR simply has to wait until a scheduled transmission is sent and listen in on the network for the expected content to be transmitted by the content server. A communication protocol that has the ability to perform this type of synchronization between servers and clients is the Internet Protocol (IP) multicast.

IP multicast is a bandwidth-conserving approach that reduces traffic by simultaneously delivering a single stream of information to a large number of clients. IP multicast has traditionally been used by applications such as: videoconferencing, corporate communications, and the distribution of software, stock quotes, and news.

IP Multicast delivers server content traffic to multiple clients without adding any additional burden on the servers or the clients while using the least network bandwidth of any competing technology. High-bandwidth applications, such as MPEG video, may require a large portion of the available network bandwidth for a single stream. In these applications, the most efficient way to send the content to more than one receiver simultaneously is by using IP Multicast. IP multicast requires that the routers, switches, firewalls, other network equipment, and connected devices that participate in the multicasting be multicast-aware (described in RFC 1458, which is incorporated herein by reference).

Figure 24:
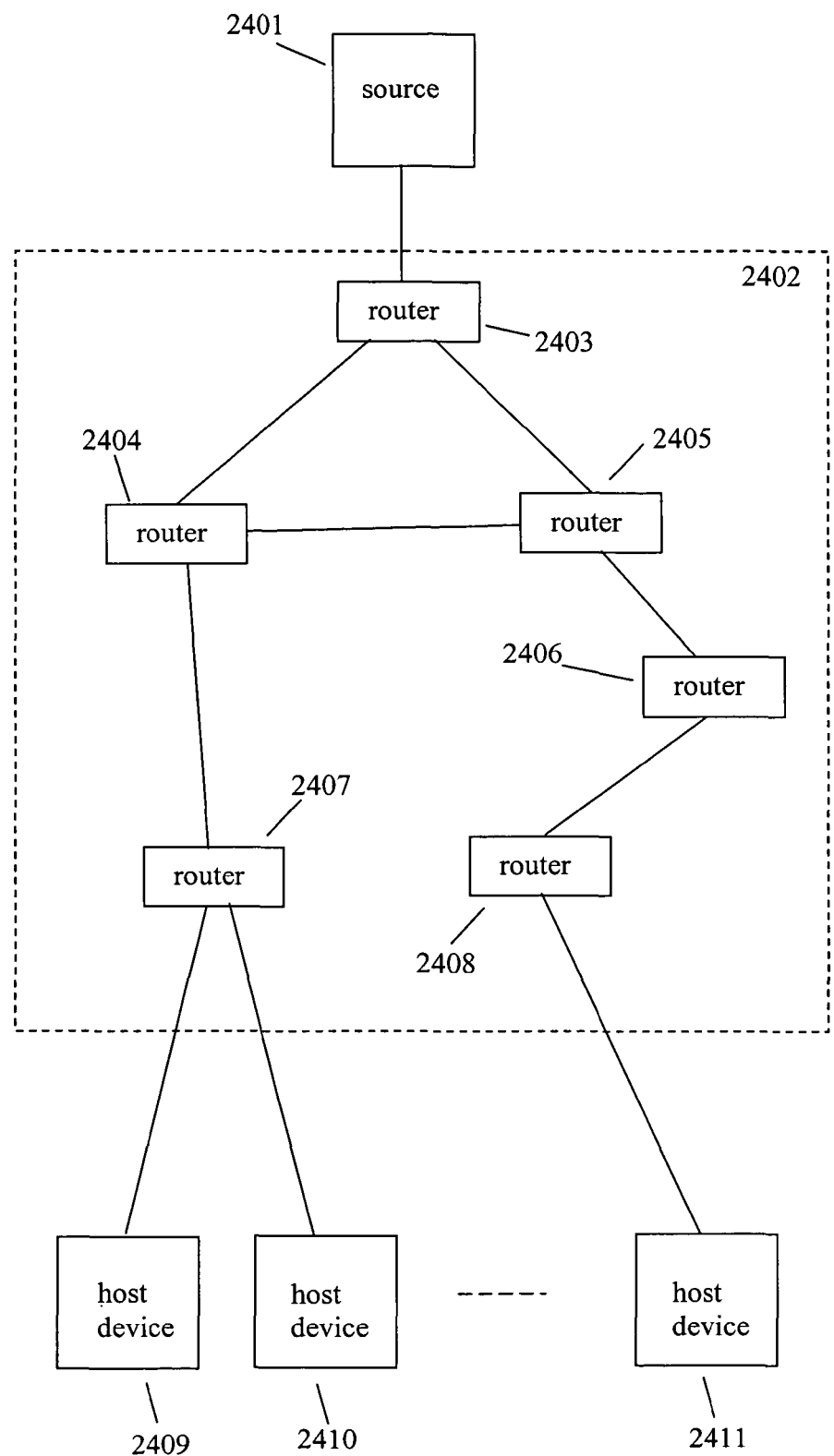
FIG. 24 is a block diagram illustrating a multicast Internet connection.

FIG. 24 shows a network 2402 that has interconnected multicast-compatible network components. A network 2402, such as the Internet, an intranet, etc., is comprised of interconnected routers 2403-2408. The routers 2403-2408 route packets of information between connected devices such as a source 2401 and host devices 2409-2411. IP multicast is different from broadcasting because, in broadcasting, a source sends a packet that is distributed to and received by all hosts in the network. In contrast, data from one source is delivered to several interested recipients using IP multicast. This means that a source 2401 can send an IP multicast message through the network 2402 to an arbitrary number of recipients. The IP multicast packets are replicated in the network 2402 by routers 2403-2408.

An arbitrary group of receivers expresses an interest in receiving a particular data stream. The group of receivers does not have any physical or geographical boundaries, so the hosts 2409-2411 can be located anywhere on the Internet. Any hosts that are interested in receiving data flowing to a particular group must join the group using Internet Group Management Protocol (IGMP). IGMP is further described in RFC 2236, which is incorporated herein by reference. A host must be a member of the group to receive the data stream. IGMP is used to dynamically register individual hosts in a multicast group on a particular LAN. A host 2409-2411 identifies group memberships by sending IGMP messages to its local router. Routers 2403-2408 listen for IGMP messages and periodically send out queries to discover which groups are active or inactive on a particular subnet.

M. Applying Multicasting Content to a Plurality of DVRS

Figure 25:
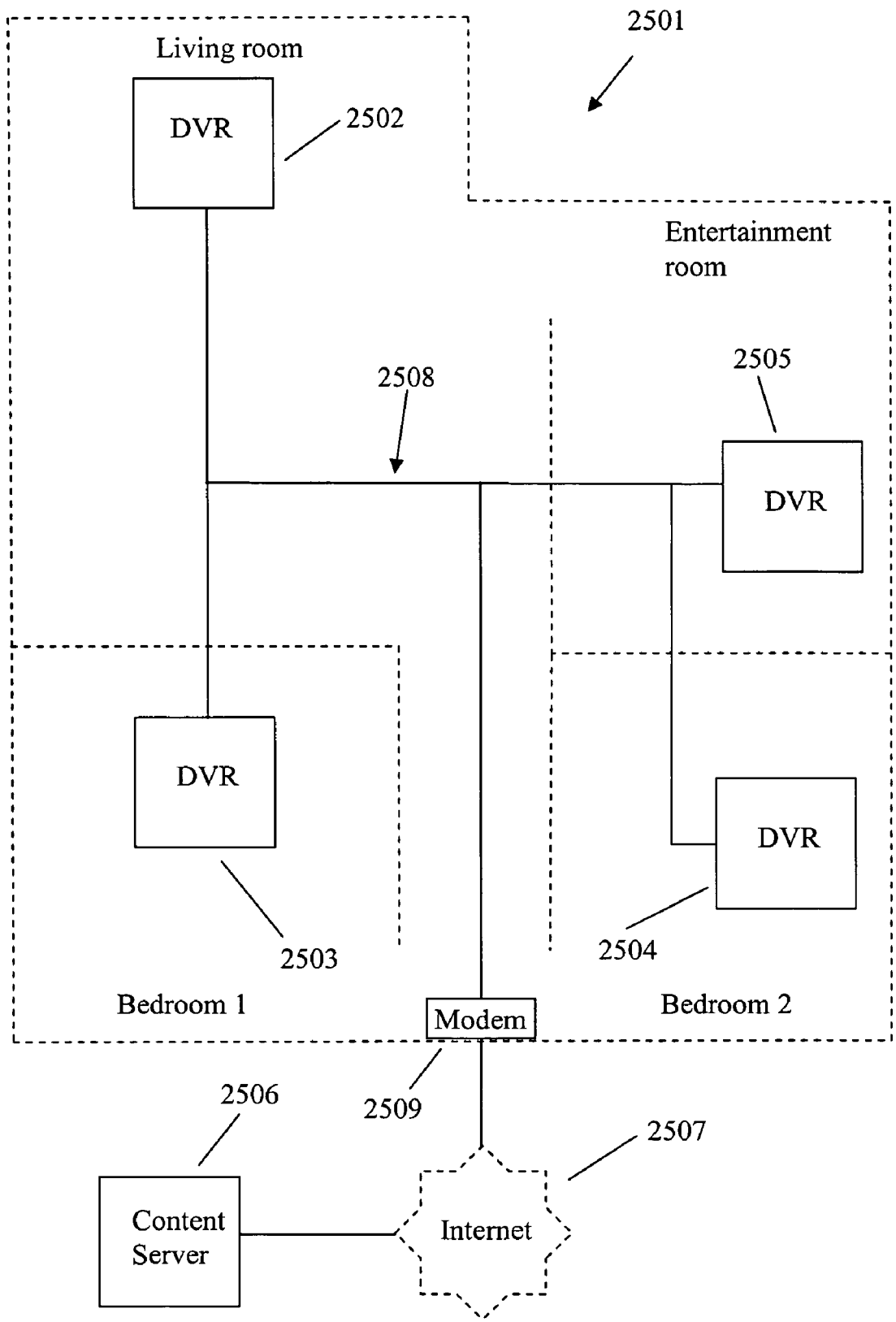
FIG. 25 is a block diagram illustrating a plurality of DVRs in a local network within a home with the DVRs having Internet access and multicast capabilities.

As the popularity of DVRs rises, more and more households will have multiple DVRs. Referring to FIG. 25, DVRs 2502, 2503, 2504, 2505, are installed in a single household. The user connects the DVRs 2502, 2503, 2504, 2505, to a local network. The DVRs 2502, 2503, 2504, 2505, periodically go through a discovery phase to determine what DVRs are connected to the local network. The DVRs 2502, 2503, 2504, 2505, discover each other's presence through a broadcast protocol that allows each DVR to find other DVRs within the local network. The household local network 2508 connects to the Internet 2507 via a connection modem 2509, for example, a DSL, cable, or satellite modem. DVRs 2502, 2503, 2504, 2505, access the household local network 2508 via Ethernet, wireless, and/or USB connections, for example.

An embodiment of the invention's DVR has four sources for multimedia content (as described above): 1) TV broadcast (i.e., cable, satellite, terrestrial, etc.); 2) media servers; 3) other DVRs; and 4) content servers. The DVRs 2502, 2503, 2504, 2505, have the ability to request content from content servers such as content server 2506 across the Internet 2507.

Content such as TV programs, movies, music, photographs, advertisements, software downloads, program guide information, and anything that can be represented as digital information can be requested by the DVRs 2502, 2503, 2504, 2505, and served by the content server 2506. With each DVR contacting a content server, a bottleneck can be created at two possible points in the connection path. The first bottleneck can be at the household's Internet connection 2509. With each DVR making requests to the content server 2506 the traffic for requests to the content server 2506 and content from the content server 2506 rises to the point of exceeding the bandwidth capacity of the connection. This type of bottleneck affects all devices connected to the household local network 2508 because access to the Internet is severely impacted.

The second bottleneck can be the content server 2506 itself. The content server 2506 must serve content requests from a large number of DVRs which means that the content server 2506 must stream content to each DVR that makes a request. Content requests may be redundant, forcing the content server 2506 to simultaneously maintain multiple streams of the same content. The bottleneck slow downs the content server's response time and content stream for all requesting DVRs.

Using IP multicast, each DVR can subscribe to a particular group that is associated with a content stream that the DVR is interested in receiving. A content server 2506 can be the multicastor for a group or set of groups A DVR can subscribe and unsubscribe to groups at will in the same manner as changing channels on a TV tuner.

The DVRs need a way to schedule their group subscriptions. The content server 2506 can create a schedule of transmission times and content description for each group that it serves. A DVR can obtain the schedule during a short connection to the content server 2506 where a daily schedule of multicast data streams may be provided. From this schedule, either automatically or as a result of user request, a DVR may queue one or more "receptions", i.e., times at which the DVR will join a multicast group and capture the multicast data stream.

In an embodiment of the invention, either automatically or at user direction, a DVR may contact the content server 2506 to query the multicast schedule for a particular data stream related to a specific content. Once informed of the scheduled transmission time, the DVR may again schedule a reception of that stream.

Figure 26:
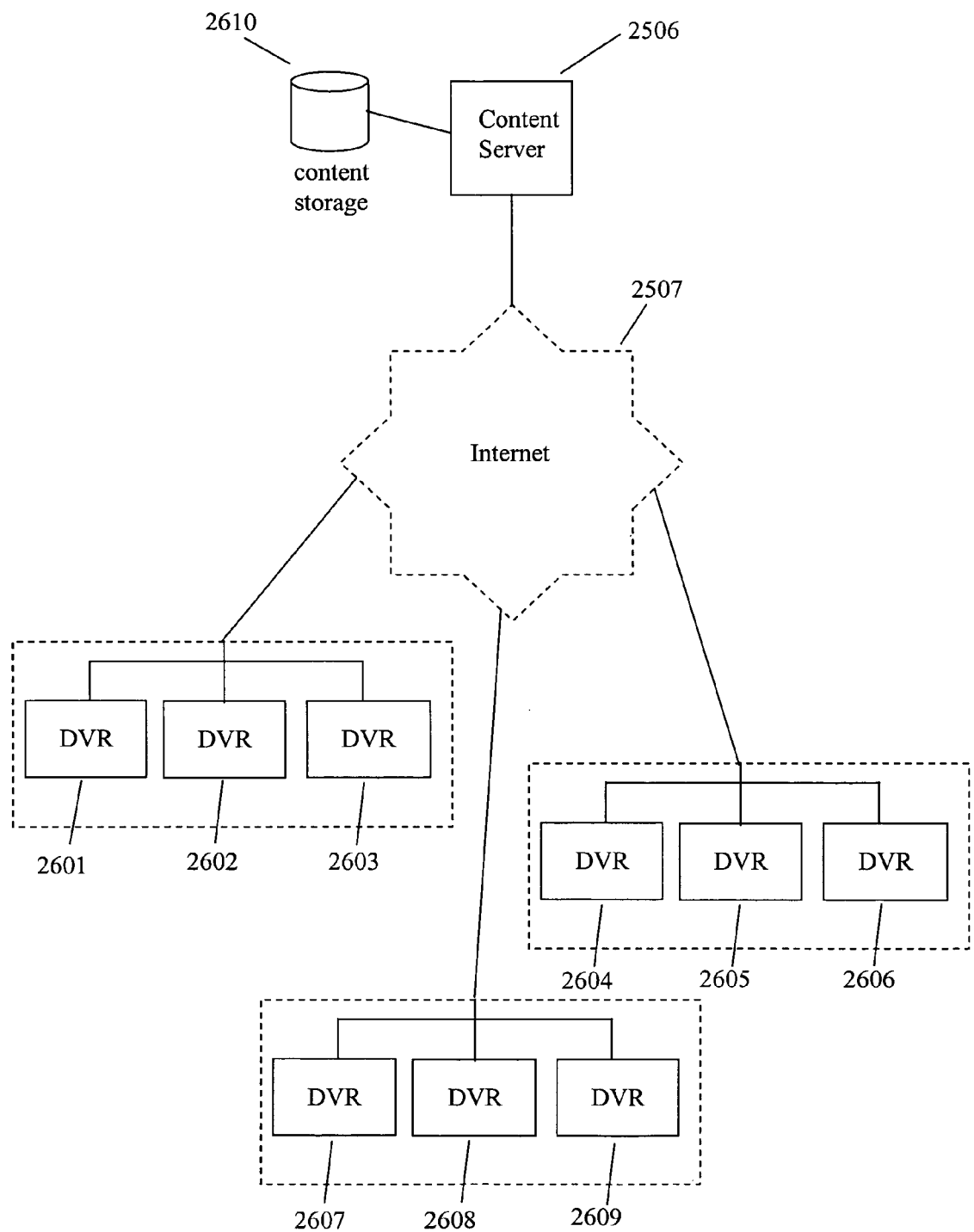
FIG. 26 is a block diagram illustrating a plurality of DVRs connected to the Internet and subscribing to multicast groups for receiving multicast transmissions from a content server.

Referring to FIG. 26, a content server 2506 creates a schedule of transmission times for data streams and assigns the streams to groups that it is responsible for 2901. DVRs 2601-2609 query the content server 2506 for the schedule across the network 2507 and receive the schedule 2902 or the schedule is pushed to the DVRs 2601-2609 by the content server 2506. The schedule contains content descriptions for each data stream for a certain time frame along with the transmission times of each particular content description.

The content server 2506 retrieves content from a content storage area 2610 and transmits the content across the Internet according to the published schedule via a multicast transmission designated for a particular multicast group.

Each DVR determines the content for which it has an interest. The DVR finds the scheduled time for transmission for the content and schedules a recording time in its recording schedule 2903. When the recording schedule indicates that the DVR is to start a recording of the group, the DVR joins the group (as described above) that is listed for the recording 2904. The DVR receives the multicast stream for the group and stores the stream on its local storage device for use by the DVR or for viewing by a user 2905.

Alternatively, each DVR can subscribe to an always-present multicast group on which the content server 2506 posts information about transmissions as they are scheduled, allowing real-time decisions by the DVR, or the user, as to whether to capture the stream or not. For example, a "breaking event" might occur (such as a bombing), and footage may be transmitted in a news multicast stream immediately. The DVR can capture the footage automatically according to a user setting or preference or the DVR can immediately inform the user via an on-screen display of the event and that the footage is available. In the latter case, the user commands the DVR to receive the multicast stream. The DVR immediately subscribes to the group and receives the data stream. The DVR decodes the data stream from whatever format it is transmitted in to the DVR's native format. The stream is then displayed to the user.

The network 2507 can be any network such as the Internet, intranet, satellite, etc. When a hybrid network is used, e.g., satellite downlink and dial-up or broadband back channel, the system works in the same manner. The multicast streams are broadcast on the satellite downlink and DVR requests travel through the backchannel.

A DVR's request for a particular data stream from a content server may not result in the immediate scheduling of its transmission. Instead, the request may be recorded along with requests from other DVRs. Using these saved requests, either automatically or manually, a content server can schedule the transmission of a data stream at any time according to any useful set of parameters.

For example, a heavily requested data stream may be scheduled for transmission in the near future, whereas a rarely requested stream may be delayed in transmission until bandwidth costs become lower. Alternatively, a data stream may be scheduled sooner or later because of importance, relevance to current events, or because of higher payments by the stream author to the content provider service.

The data streams are not required to be sent nor arrive at real-time streaming media rates. The DVR can buffer the entire transmission on its disk drive or local memory before making the content available to the user.

The DVR can subscribe to multiple groups and can receive multiple multicast streams in parallel. The streams can be of varying bandwidth and differing content. This allows the DVR to make the best use of its bandwidth and to service several needs at once.

Using various techniques, it is possible to encode the data transmission in such a way that a moderate amount of lost packets can be tolerated. The tradeoff is an increase in the size of the transmission (for redundancy), but that situation is tolerable in a non-realtime situation. At worse, if the DVR can not successfully receive the entire transmission, it can wait for the next transmission of that data stream and re-attempt the capture of the stream.

N. Creating a Virtual Multicast Network

Figure 27:
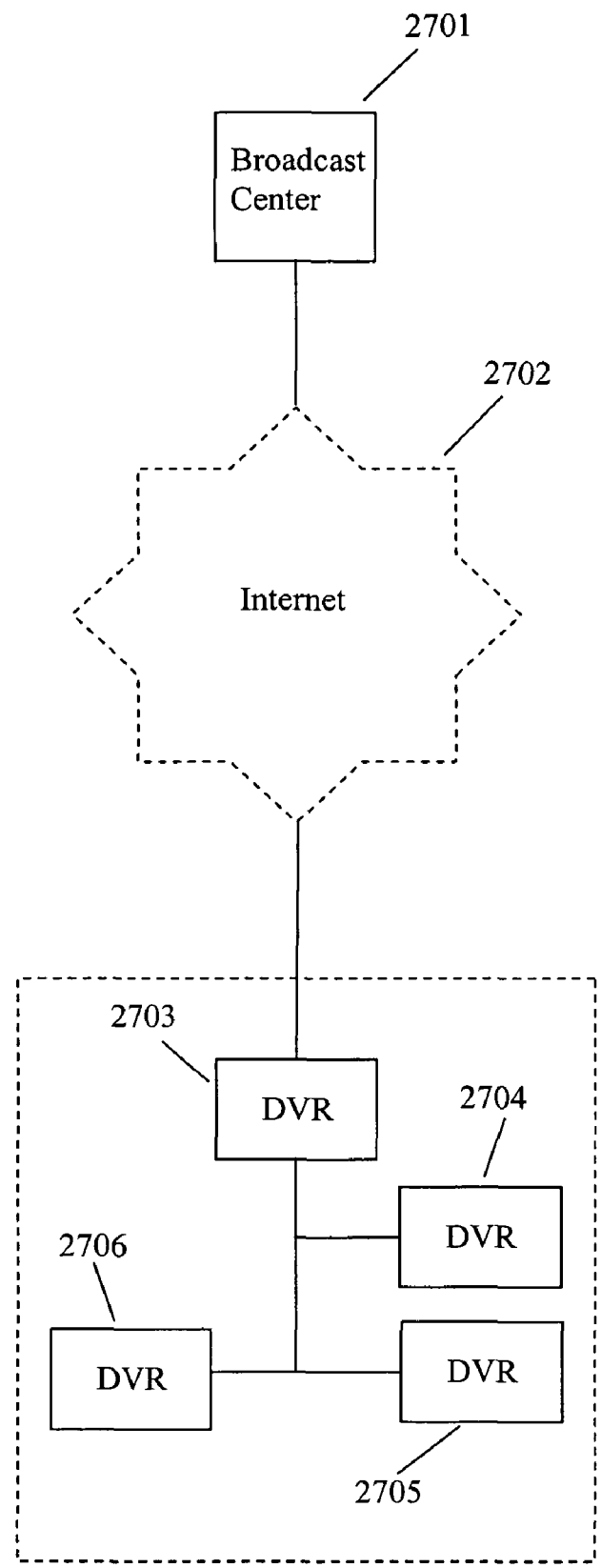
FIG. 27 is a block diagram illustrating a virtual multicast connection using a multicast tunnel DVR connected to a plurality of DVRs on a local network.
Figure 30:
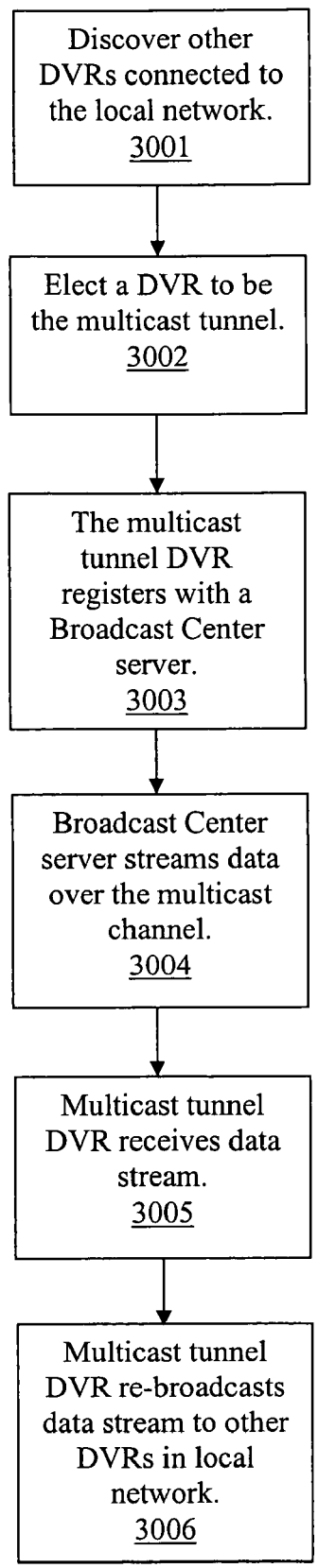
FIG. 30 is a flow diagram illustrating a system for creating a virtual multicasting network between a content server and a DVR.

In the event that IP multicast has too many restrictions on the network equipment, a virtual multicasting system can be implemented using networked DVRs. Referring to FIGS. 27 and 30, a virtual multicasting system is shown using DVR multicasting tunneling. Through broadcast, the DVRs 2703-2706 discover each other 3001 and hold an election to see which DVR is to be the "multicast tunnel" 3002. In this example DVR 2703 is elected as the multicast tunnel. The connections between DVRs 2703-2706 shown in FIG. 27 reflect a conceptual data routing and not the actual physical electrical connections in the local network.

The winning DVR 2703 connects to the Broadcast Center 2701 and registers to receive any multicast streams of interest 3003 over the network 2702. The other DVRs 2704-2706 in the network register with the winner DVR 2703 for specific multicast transmissions. The Broadcast Center 2701 transmits a multicast data stream 3004 over the Internet 2702 to the winner DVR 2703. The winner DVR 2703 receives the multicast data stream packets 3005 and re-broadcasts the packets on the local network to the other DVRs 2704-2706 that have registered for the specific data stream, 3006. The winner DVR 2803 has become a multicast tunnel DVR, thereby bringing multicast streams into the local network efficiently.

Alternatively, the winner DVR 2703 can simply re-broadcast the packets on the local network to the other DVRs 2704-2706 and allow the other DVRs to decide whether to keep, ignore, or discard the packets.

Although one set of DVRs is shown in FIG. 27, a plurality of DVR sets and Broadcast Centers are easily covered by an embodiment of the invention. As noted above, a DVR can receive multiple multicast streams that vary in bandwidth and differ in content. The DVR can register for multiple multicast transmissions with a multiple Broadcast Centers as well as a single Broadcast Center.

A multicast stream can encapsulate other multicast stream(s). This means that a DVR that is elected as a multicast tunnel can unpack the multicast stream(s) and send the stream(s) to other multicast tunnels or broadcast the streams locally. The encapsulated multicast stream(s) can further contain multicast stream(s) up to a logical capacity.

The Broadcast Center 2701 needs to scale to handle many millions of active DVRs. In order to support this, the protocol used for initiating the multicast tunnel supports delegation, i.e., a responding Broadcast Center server may redirect the local multicast tunnel DVR to another Broadcast Center server. This allows a load balancing between Broadcast Center servers and further allows for assigning a Broadcast Center server to DVRs that are close geographically to the Broadcast Center server allowing for more efficient communications (described in more detail below).

The DVRs are supplied with an estimated local Broadcast Center server to initially contact once an election is resolved. This information is given to a DVR when it goes through its initialization setup process when the user first turns on the unit after purchase or the user manually initiates the setup process. The DVR contacts the DVR service provider during initialization to obtain its latest software release and determine other setup parameters, such as billing information, whether the DVR has been authorized to operate at a certain feature level, etc.

The population of Broadcast Center servers may be in one location (or a server farm) or spread out geographically and interconnected with a closed multicast network. Thus, the single packet stream of the broadcast will be fanned out among the servers. The servers forward the packets down the connection to the multicast tunnel DVRs and the multicast tunnel DVRs re-broadcast the packets to local DVRs.

The delegation of a multicast tunnel DVR to a particular Broadcast Center server may be based on server load or the network location of the multicast tunnel DVR. The topology of network connections from various DVRs can be recorded by the Broadcast Center servers. As each multicast DVR registers with a Broadcast Center server, the servers create a network topology of connected DVRs. The topology can be collaborative where a central server tabulates topology data gathered from all of the Broadcast Center servers and redistributes a topology map to all of the Broadcast Center servers. From this topology, it is possible to infer which connections are "close" to each other in terms of network hops (which can be measured using border gateway protocol (BGP) or time to live (TTL) values) or geographically close. Given this data, it is possible for a server to delegate a multicast tunnel DVR to a close connecting Broadcast Center server. This can result in much better efficiency of bandwidth usage and improved response.

During the tunnel setup process, the connecting multicast tunnel DVR can supply its "real" IP address to the Broadcast Center server, allowing the topology of DVRs to be refined sufficiently to "see" behind the firewall. This allows the delegation of a tunnel to be much more targeted, thereby bringing even greater efficiencies to the overall broadcast network.

Should a multicast tunnel DVR 2703 cease operation in a network for some reason, the system's connection protocol provides a way in which other DVRs 2704-2706 in that network discover that the tunnel DVR has failed, e.g. occasional keepalive pinging to or from the tunnel DVR. The first DVR to notice that the tunnel DVR 2703 is down will force another election. A new tunnel DVR is then elected and the new tunnel DVR re-initiates tunneling with the service via a Broadcast Center server.

The multicast service provides additional levels of reliability through multiple transmissions of important data at scheduled times. In order to ensure secure operation of the multicast backbone, a connecting multicast tunnel DVR can authenticate itself to the Broadcast Center server, using authentication policies described above. During delegation, the Broadcast Center server will provide an encrypted nonce (a time tag, encrypted value, etc.) to the DVR.

The nonce is transmitted to the target DVR of the delegation, and that target DVR will verify that the nonce is valid (e.g., the nonce can be properly decrypted with a public key from the DVR service, the nonce is not "old", etc.). Once validated, multicast packets can be relayed to the tunnel DVR.

Two approaches can be taken for security within a subnet. The first approach is to require all multicast receivers on a subnet to have a shared security certificate from the DVR service provider. The second approach is to allow any DVR to subscribe to the multicast, and assume that sensitive transmissions are encrypted by the service. The second approach typically works best because it lowers the administrative and support burden with no loss in security.

The embodiment's virtual multicast backbone can be an effective way to deliver most of the benefits of a global multicast-enabled network without actually implementing said network. Using the topology of tunnel connections, the Broadcast Center can effectively balance loads to ensure that no network becomes overloaded.

O. Multicasting Broadcaster

Figure 28:
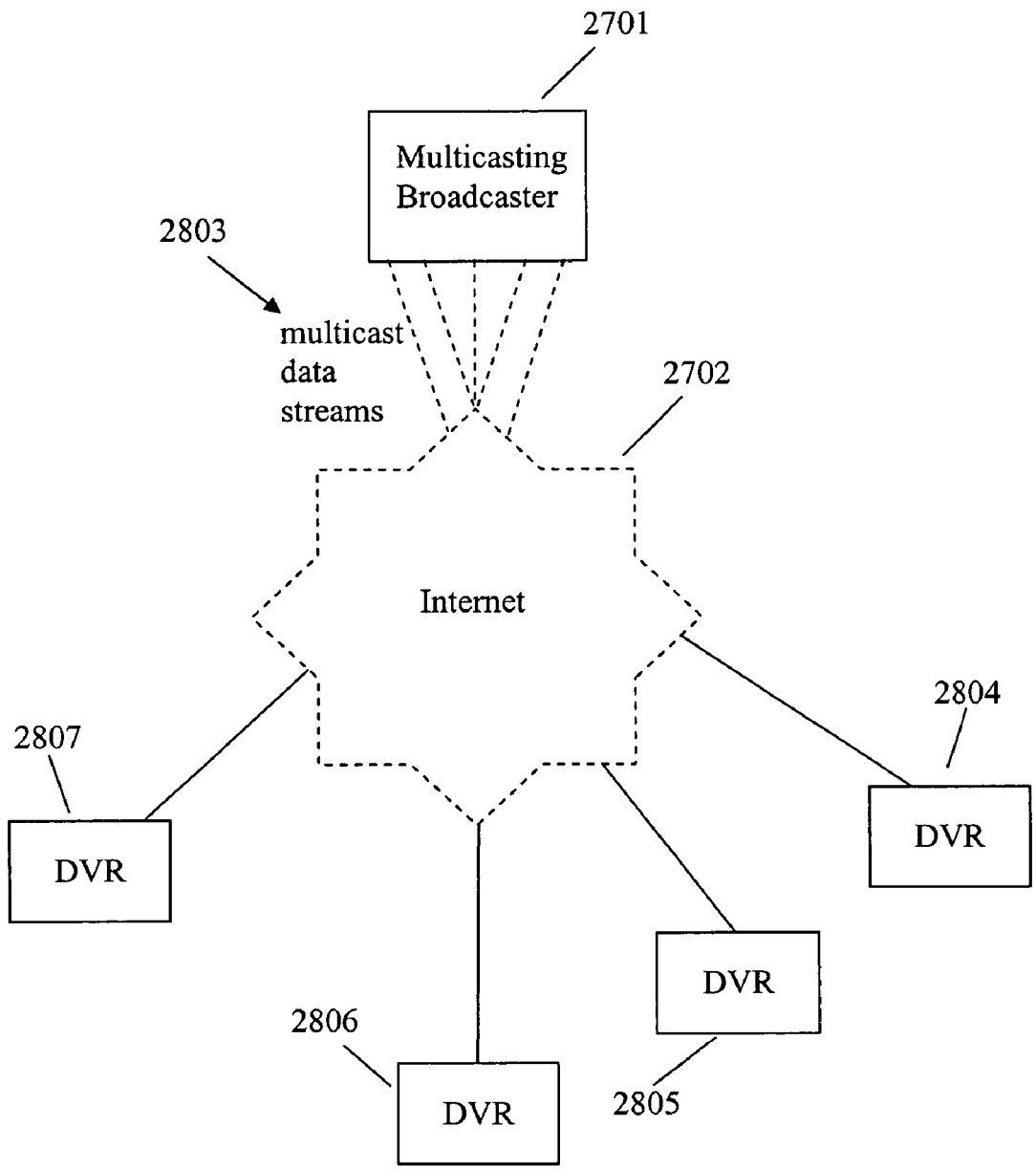
FIG. 28 is a block diagram illustrating a multicasting broadcast center server transmitting data streams to a plurality of DVRs across the Internet.
Figure 29:
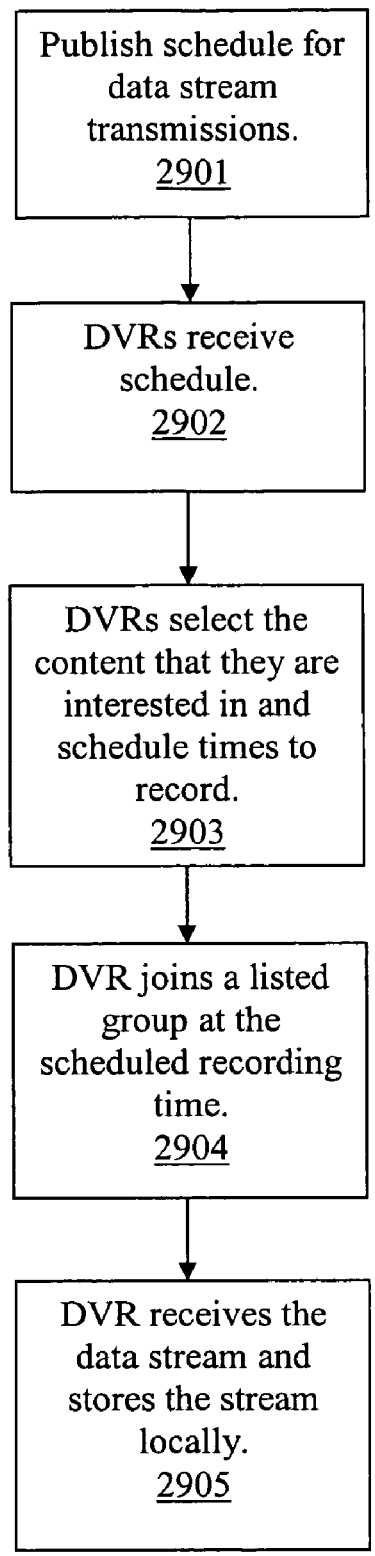
FIG. 29 is a flow diagram illustrating a system for distribution of content to DVRs using multicast.

The role of the multicastor functions in many ways like a multichannel broadcaster (e.g., satellite or cable system operator). Referring to FIG. 28, given sufficient data streams of interest, the multicasting broadcaster 2801 provides an "always-on" multicast of data streams 2803 across the Internet 2802. If the data streams 2803 were all TV programs, than the always-on stream would be analogous to a television network broadcast, except that the transmission rate does not need to match the real-time data rate of the TV programs. The transmission rate can be increased or decreased as needed to meet demand or to lower cost.

DVRs 2804-2807 listen in on specific multicast data streams 2803 at specific times in the same manner as tuning to a TV broadcast channel. The content in the data streams are stored on the DVR's local storage and assembled as the stream is being received. Depending on the transmission rate of the multicast data streams 2803 (i.e., the transmission rate is equal to or faster than normal viewing rates), the DVR can display the data stream to the user as it receives the data stream.

Response time for data streams might be improved by multicasting various streams in parallel, much as a cable head-end broadcasts multiple channels. These multiple streams can also represent different types of data streams. For example, one multicast stream might be regularly scheduled with data streams of interest, such as a regular sequence of news or sports programs. Another multicast stream might be used for satisfying DVR or user requests for particular data streams. Yet another might carry ancillary data, such as metadata about what data streams are available for multicasting.

The multicastor is also an aggregator of content. Through contractual relationships, various content owners can make data streams of interest available. A fee is charged to each content owner for transmission of content. A further fee can be charged based on the number if downloads. Also, since the DVR can track what a user views, a fee can be based on the number of times content is viewed by users. All of this information is gathered at a central billing server where the service provider can calculate the fees for each content owner and invoice the content owners.

Before the scheduled transmission time, the multicastor could download a copy of a program to local cache, transmit the program at the scheduled time, and then destroy the copy. Alternatively, the multicastor might provide services such as transmitting the data multiple times to ensure that all possible DVRs receive the data.

Using uploaded information from the population of DVRs, the multicastor can tune or alter aspects of the services that it provides. A heavily watched TV program might cause the multicastor to make other episodes available or to transmit certain episodes earlier. DVRs that have trouble receiving the multicasts can report that information to the multicastor, such that the multicastor might work with Internet Service Providers to correct network problems.

Like a multi-channel broadcaster, the multicastor typically provides security for both content and the actual multicasting service. Using a mechanism such as the security schema described above, it is possible to authenticate DVRs to the service and vice-versa, control service activation, and properly encrypt content while it passes over the Internet. For example, during the daily connection to the multicastor service, the next day's encryption keys for each multicasted channel of content might be downloaded to a DVR and securely stored, but only after authentication of the DVR and a determination of its service level.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for a multicasting multimedia content distribution system, the method comprising:
   receiving a transmission schedule from a content server at a digital video recorder (DVR), the transmission schedule indicates transmission times for data streams;
   creating a virtual multicast link between the content server and the DVR, the DVR registers with the content server for a specific data stream; and
   receiving the specific data stream at the DVR from the content server at a scheduled time indicated by the transmission schedule, particular DVRs connected to a common local network register with the DVR to specify which data streams that a particular DVR wants to receive from the DVR.

2. A method as recited in claim 1, wherein the DVR is elected as a multicast tunnel DVR by other DVRs connected to the common local network.

3. A method as recited in claim 2, wherein the multicast tunnel DVR rebroadcasts the received specific data stream to other DVRs connected to the common local network.

4. A method as recited in claim 2, wherein the multicast tunnel DVR transmits the received specific data stream to DVRs registered to receive the specific data stream.

5. A method as recited in claim 1, wherein the transmission schedule receiving step requests the multicast transmission schedule from the content server.

6. A method as recited in claim 1, wherein the transmission schedule receiving step receives the multicast transmission schedule pushed from the content server.

7. A method as recited in claim 1, further comprising:
   charging a content owner a fee based on transmission rates of content in data streams and/or content viewing occurrences.

8. An apparatus for a multicasting multimedia content distribution system, comprising:
   a logic that receives a transmission schedule from a content server at a digital video recorder (DVR), the transmission schedule indicates transmission times for data streams;
   a logic that creates a virtual multicast link between the content server and the DVR, the DVR registers with the content server for a specific data stream; and
   a logic that receives the specific data stream at the DVR from the content server at a scheduled time indicated by the transmission schedule, particular DVRs connected to a common local network register with the DVR to specify which data streams that a particular DVR wants to receive from the DVR.

9. An apparatus as recited in claim 8, wherein the DVR is elected as a multicast tunnel DVR by other DVRs connected to the common local network.

10. An apparatus as recited in claim 9, wherein the multicast tunnel DVR rebroadcasts the received specific data stream to other DVRs connected to the common local network.

11. An apparatus as recited in claim 9, wherein the multicast tunnel DVR transmits the received specific data stream to DVRs registered to receive the specific data stream.

12. An apparatus as recited in claim 8, wherein the transmission schedule receiving logic requests the multicast transmission schedule from the content server.

13. An apparatus as recited in claim 8, wherein the transmission schedule receiving logic receives the multicast transmission schedule pushed from the content server.

14. An apparatus as recited in claim 8, further comprising:
   a logic that charges a content owner a fee based on transmission rates of content in data streams and/or content viewing occurrences.

15. A computer-readable medium carrying one or more sequences of instructions for a multicasting multimedia content distribution system, wherein execution of the one or more sequences of instructions by one or more processors causes the one or more processors to perform the steps of:
   receiving a transmission schedule from a content server at a digital video recorder (DVR), the transmission schedule indicates transmission times for data streams;
   creating a virtual multicast link between the content server and the DVR, the DVR registers with the content server for a specific data stream; and
   receiving the specific data stream at the DVR from the content server at a scheduled time indicated by the transmission schedule, particular DVRs connected to a common local network register with the DVR to specify which data streams that a particular DVR wants to receive from the DVR.

16. A computer-readable medium as recited in claim 15, wherein the DVR is elected as a multicast tunnel DVR by other DVRs connected to the common local network.

17. A computer-readable medium as recited in claim 16, wherein the multicast tunnel DVR rebroadcasts the received specific data stream to other DVRs connected to the common local network.

18. A computer-readable medium as recited in claim 16, wherein the multicast tunnel DVR transmits the received specific data stream to DVRs registered to receive the specific data stream.

19. A computer-readable medium as recited in claim 15, wherein the transmission schedule receiving step requests the multicast transmission schedule from the content server.

20. A computer-readable medium as recited in claim 15, wherein the transmission schedule receiving step receives the multicast transmission schedule pushed from the content server.

21. A computer-readable medium as recited in claim 15, further comprising:
   charging a content owner a fee based on transmission rates of content in data streams and/or content viewing occurrences.

* * * * *